US011212183B1

(12) United States Patent
Hankins et al.

(10) Patent No.: US 11,212,183 B1
(45) Date of Patent: Dec. 28, 2021

(54) NETWORK DEVICE IDENTIFICATION

(71) Applicant: Palisade Networks, Inc., Cupertino, CA (US)

(72) Inventors: Scott Andrew Hankins, Cupertino, CA (US); Thomas James Geisler, III, Cupertino, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 16/441,880

(22) Filed: Jun. 14, 2019

(51) Int. Cl.
*H04L 12/24* (2006.01)
*G06F 9/30* (2018.01)
*G06N 20/00* (2019.01)

(52) U.S. Cl.
CPC .......... *H04L 41/12* (2013.01); *G06F 9/30036* (2013.01); *G06N 20/00* (2019.01)

(58) Field of Classification Search
CPC ...... H04L 41/12; G06N 20/00; G06F 9/30036
See application file for complete search history.

(56) References Cited

U.S. PATENT DOCUMENTS

| | | | |
|---|---|---|---|
| 10,187,353 B2 | 1/2019 | Muppala et al. | |
| 2012/0079101 A1* | 3/2012 | Muppala | H04L 63/1425 709/224 |
| 2015/0113626 A1* | 4/2015 | Bocanegra Alvarez | H04L 63/0815 726/8 |
| 2015/0310352 A1* | 10/2015 | Kyaw | G06N 5/022 706/12 |
| 2016/0323186 A1* | 11/2016 | Dillon | H04L 67/02 |
| 2020/0137115 A1* | 4/2020 | Janakiraman | H04L 12/4633 |

OTHER PUBLICATIONS

Wikipedia, "Machine learning," http://en.wikipedia.org/wiki/Machine_learning, Jun. 8, 2019, 18 Pages.
Wikipedia, "Logistic regression," http://en.wikipedia.org/wiki/Logistic_regression, Jun. 9, 2019, 22 Pages.
Wikipedia, "Support-vector machine," http://en.wikipedia.org/wiki/Support-vector_machine, May 22, 2019, 17 Pages.

* cited by examiner

*Primary Examiner* — John A Follansbee
*Assistant Examiner* — Raqiul A Choudhury
(74) *Attorney, Agent, or Firm* — Clements Bernard Baratta Walker; Lawrence A. Baratta, Jr.

(57) ABSTRACT

Briefly, embodiments, such as methods and/or systems for network device identification, for example, are described.

19 Claims, 18 Drawing Sheets

TABLE 1

```
Date flow start          Duration Proto   Src IP Addr:Port         Dst IP Addr:Port         Packets   Bytes Flows
2010-09-01 00:00:00.459    0.000 UDP      127.0.0.1:24920    ->    192.168.0.1:22126           1        46    1
2010-09-01 00:00:00.363    0.000 UDP      192.168.0.1:22126  ->    127.0.0.1:24920             1        80    1
```

TABLE 2

| timestamp | source IP | source port | dest IP | dest port | protocol | application | name |
|---|---|---|---|---|---|---|---|
| Fri Apr 12 01:40:36 UTC 2019 | 10.10.0.152 | 35356 | 8.8.8.8 | 53 | UDP | DNS | www.example.com |

TABLE 3

| timestamp | source IP | source port | dest IP | dest port | protocol | application | name |
|---|---|---|---|---|---|---|---|
| 02:29:23 | 10.10.0.10 | 35356 | 8.8.8.8 | 53 | UDP | DNS | somedomain.com |
| 02:29:41 | 10.10.0.10 | 35456 | 1.2.3.4 | 443 | TCP | SSL | appserver-1.somedomain.com |
| 02:29:51 | 10.10.0.10 | 35501 | 1.2.3.4 | 443 | TCP | SSL | appserver-2.somedomain.com |
| 02:30:01 | 10.10.0.10 | 35599 | 216.239.35.12 | 123 | UDP | NTP | |

TABLE 4

| application | name |
|---|---|
| DNS | somedomain.com |
| SSL | appserver-1.somedomain.com |
| SSL | appserver-2.somedomain.com |

Figure 8B

TABLE 5

| application | name |
|---|---|
| DNS | somedomain |
| SSL | appserver somedomain |
| SSL | appserver somedomain |

TABLE 6

DNS somedomain SSL appserver somedomain

TABLE 7

DNS somedomain SSL appserver somedomain SSL appserver somedomain

TABLE 8

```
from sklearn.linear_model import LogisticRegression
v_train = transformed_training_vectors
l_train = lables_for_transformed_training_vectors
clf = LogisticRegression()
clf.fit(v_train, l_train)
```

TABLE 9

```
from sklearn.linear_model import LogisticRegression
v_train = transformed_training_vectors
l_train = lables_for_transformed_training_vectors
v_test  = transformed_test_vectors
l_test  = lables_for_transformed_test_vectors clf = LogisticRegression()
clf.fit(v_train, l_train)

accuracy = clf.score(v_test, l_test)
```

TABLE 10

```
v = single_transformed_data_vector
prediction_value = clf.predict_proba(v)
```

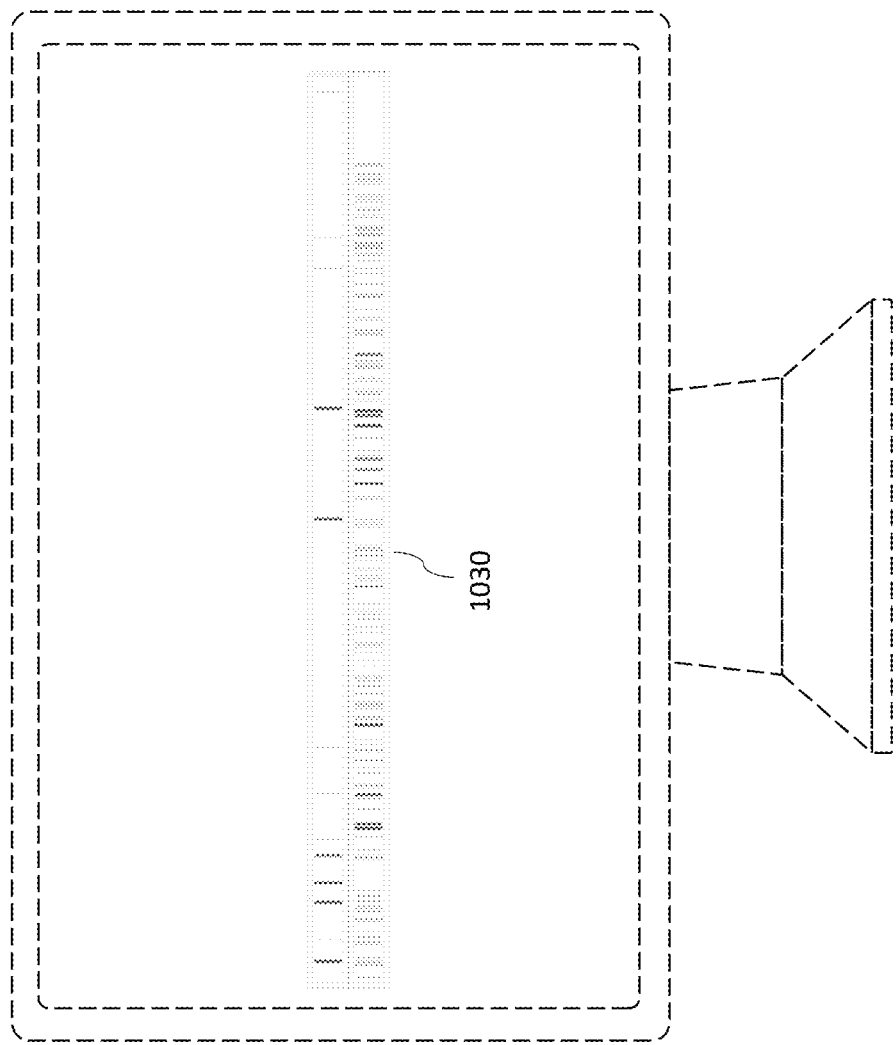

NETWORK DEVICE IDENTIFICATION

BACKGROUND

1. Field

This disclosure relates to systems and/or methods to perform identification of network devices engaging in network communications.

2. Information

As is known, malware and/or security breaches continue to be an issue for networks, such as private networks that include network devices that form the private network and which also engage in communications via the internet, for example. Thus, various security protocols for organizations have been introduced. Likewise, software for desktops, laptops and even tablets also exist to assist in reducing the risk of security breaches. However, as the internet grows in importance and use of networking technology becomes mainstream for businesses, these risks continue to increase. Thus, approaches to address security risks continue to be sought.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 8A-8B illustrate Tables 1-10, described in the specification in connection with various embodiments of claimed subject matter;

FIGS. 10A-10H are examples or illustrations of sample network device communication flow visualizations on a display screen capable of being produced by an embodiment in accordance with claimed subject matter.

Figure 1:
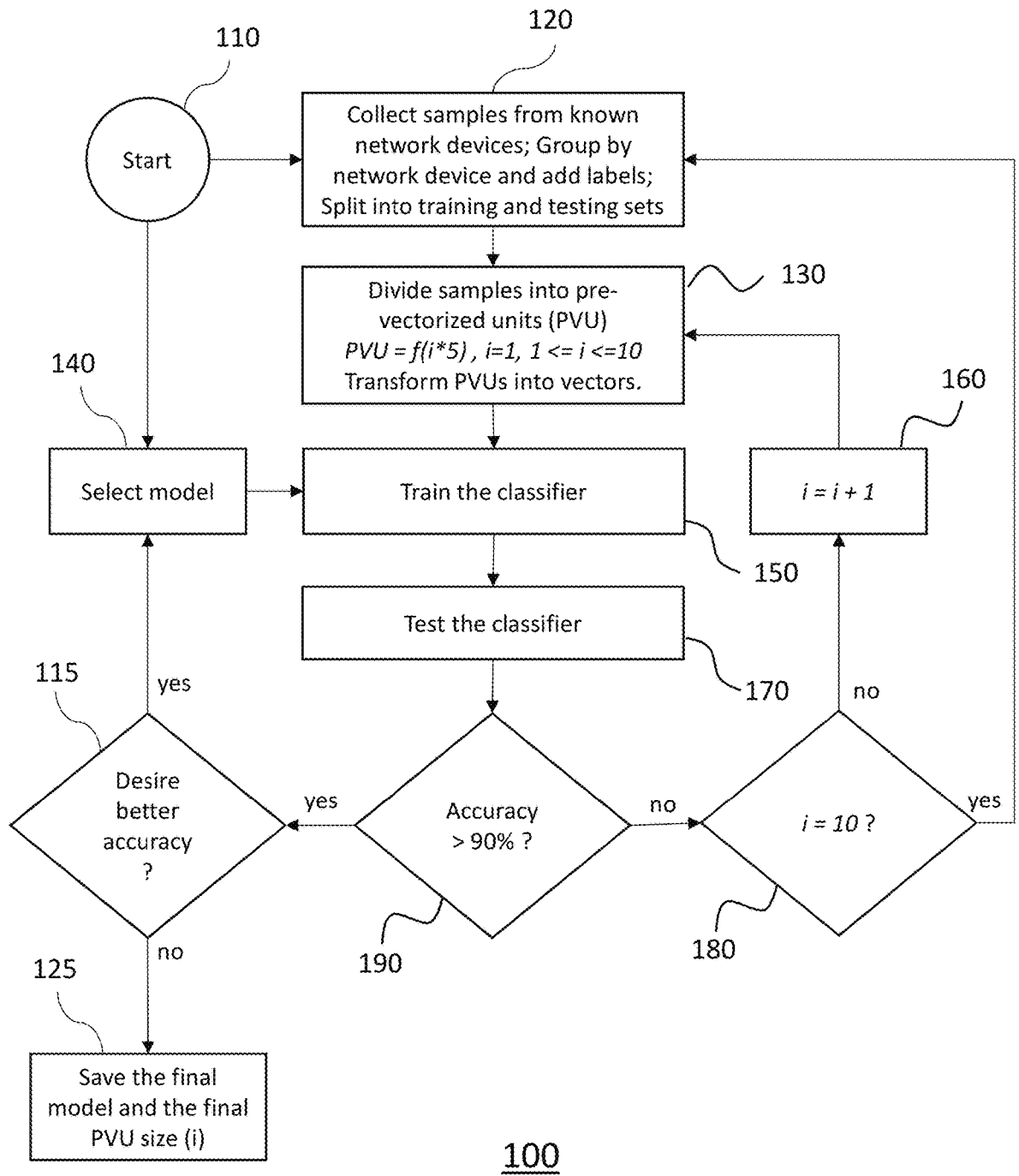
FIG. 1 is a flowchart of one embodiment in accordance with claimed subject matter.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As is known, malware and/or security breaches continue to be an issue for networks, such as private networks that include network devices that form the private network and which also engage in communications via the internet, for example. Thus, various security protocols for organizations have been introduced. Likewise, software for desktops, laptops and even tablets also exist to assist in reducing the risk of security breaches. However, as the internet grows in importance and use of networking technology becomes mainstream for businesses, these risks continue to increase. Thus, approaches to address security risks continue to be sought.

Likewise, with advancement of network technology and the ubiquitous nature of the world wide web, so called "smart devices," that couple or connect to a network, have been introduced into the marketplace and are being employed. In this context, the term smart device refers to an electronic device, able to connect or couple to one or more other electronic devices and/or to a network, which may include a wireless network, such as via any of a variety of potential protocols, such as Bluetooth, NFC, Wi-Fi, LiFi, and/or 3G, as a few illustrations. It is understood that reference to these protocols, such as Bluetooth, NFC, Wi-Fi, LiFi, and/or 3G is intended to reference any and all previous or future versions of these protocols. A smart device may operate to some extent interactively and/or autonomously. Several notable illustrations of types of smart devices include smartphones, smart cars, smart thermostats, smart doorbells, smart locks, smart refrigerators, smartwatches, smart bands, smart key chains, and/or smart speakers, among others. A smart device may also exhibit aspects and/or features related to the so-called Internet of Things (IOT) and/or pervasive computing, including, for example, although not necessarily, use of artificial intelligence. It is noted that a smart device is a network device, as later defined.

Since smart devices attach (e.g., couple or connect) to a network, such as a private network, for example, smart devices may present risks with respect to network security; however, due at least in part to the nature of these devices, these risks may not currently be fully addressed by state of the art technology, including state of the art network technology. While security software and/or security protocols to address, for example, malware and/or security breach risks associated with more complex platforms, such as desktop or laptop computers, a smart device may have a sufficiently smaller "footprint" (e.g., available processing power and/or memory resources) that such traditional approaches to network security, such as via software, for example, may not be readily applicable. Thus, another approach is desirable.

In an embodiment in accordance with claimed subject matter, one approach involves monitoring network communications (e.g., network traffic) for a network, such as for a private network. Via monitoring, one or more network devices communicating over a particular network may be identified. Thus, by identifying the network devices communicating over a particular network, network devices that present acceptable risks to security, such as devices from reputable manufacturers, for example, are able to be identified. Likewise, network devices that appear to be engaged in unusual (e.g., suspicious) network communication activity, which may present risks, may be identified and may potentially be isolated and/or blocked from communicating over the particular network, for example.

In this context, it is noted that identifying a network device, including identifying a particular network device, in general, refers to identifying a particular type of network device. For example, as a simple illustration, without intending to limit claimed subject matter scope, if a particular type of nest thermostat joined a network, it is capable of being identified by monitoring network communications, as later described. Thus, while one particular nest thermostat, in this example, joined the network, and, thus, a particular network device is identified in this example, any nest thermostat of that type is capable of being identified. However, it is likewise noted that the foregoing is not intended to exclude a situation where a single particular network device is identified, rather than a particular type of network device, since that situation is also capable of being handled in accordance with claimed subject matter.

Traditionally, network administrators (e.g., human operators who may be experienced in networking technology) perform services that included monitoring network communications (e.g., network traffic) to look for suspicious network device activity. However, that approach tends to be labor intensive and relatively inefficient, especially as networks grow in size. Furthermore, it involves having individuals with deep networking expertise. Limited experiential knowledge of a specific network administrator may therefore potentially represent a risk because that individual may inadvertently overlook suspicious network device communications as a result of that individual's limited experience, for example.

Instead, an approach that employs use of technology, rather than human judgement, is proposed. Such an approach may both be more cost efficient and may reduce risks associated with relying on the judgement of a single individual who may have limited experience, thus, making it potentially more reliable.

In one embodiment of claimed subject matter, as an illustration, a method of identifying a particular network device is described, such as, for a particular network device engaging in network communications via a network. Thus, for a period of time, respective network communication flows engaged in by a particular network device are monitored. It is noted that for a particular network device, a network communication flow may include network communications from the particular network device and network communications to the particular network device. A respective monitored network communication flow comprises flow detail records that include a set of network flow communication parameters. Selected network flow communication parameters for the respective monitored network communication flows with respect to the particular network device over the period of time are processed in a time sequenced order, after having monitored a particular number of respective network communication flows for the period of time with respect to the particular network device. A count of the processed network flow communication parameters captured over the period of time is vectorized. Based at least in part on the vectorized count for the particular network device, the particular network device is identified. Of course, it is noted that claimed subject matter is not intended to be limited to particular embodiments described primarily for purposes of illustration, such as described previously and/or hereinafter.

As shall be described in greater detail, for an embodiment, machine learning classification, for example, may be employed in connection with identification of a particular network device as a result of monitoring network device communications. Of course, claimed subject matter is not necessarily intended to be limited in scope in this respect. Nonetheless, in this context, classification refers to identifying to which of a set of categories (e.g., sub-categories) a "new" observation (e.g., sample) belongs, on the basis of a training set of "previous" observations (e.g., samples) whose category membership is known. Machine learning refers to the scientific study of processes that computing systems use to perform a specific task effectively without using explicit programming instructions, instead relying on patterns and/or inference. Supervisory machine learning processes build a model based at least in part on known samples, which are employed to "train" a process, in order to make predictions and/or decisions without being explicitly programmed to perform the task. In an illustrative embodiment, a model may comprise a matrix of weights and a vector of biases or offsets, (e.g., a linear model) as shall be explained in more detail; however, in other embodiments, a model may be more complex, such as including higher order terms. Likewise, as another example, a model may comprise a vector of weights and a single offset or bias value, as shown later, for example. A process that performs classification is referred to in this context as a classifier. Here, therefore, specifically, in one embodiment, identification of a particular network device may be possible via classification of network communications that have taken place with respect to that particular network device.

In the terminology of machine learning, classification is considered an instance of supervised machine learning. An unsupervised machine learning procedure, meaning that known samples are not available for use, is sometimes also referred to as clustering, and involves grouping or categorizing based at least in part on some measure of similarity. However, for ease of discussion, we use the term classification or classifier in this context for both supervisory and un-supervisory machine learning. Other types of classifiers, such as in un-supervisory machine learning, for example, typically work by comparing observations to previous, but unknown, observations using a similarity operation.

In supervised machine learning, as mentioned, a process is used to build a model from a set of known samples. For example, if a task were determining whether an image contained a certain object, training samples for a supervised machine learning process would include images with and without that object, and the images (e.g., samples) would have a label designating whether the particular image contained the object. In unsupervised machine learning, a process builds a model without a set of known samples. Unsupervised machine learning processes seek to find structural and/or other measurable similarities of samples, like grouping or clustering of unknown samples, again, as was mentioned.

Of course, a variety of approaches to classification, including machine learning classification, are available and it is not intended that claimed subject matter necessarily be limited to a particular approach. Thus, while several approaches are discussed in detail as illustrative examples, again, it is not intended that claimed subject matter be limited in scope to examples provided for illustration purposes. For example, machine learning classification, as discussed above, includes both supervised machine learning and unsupervised machine learning. While the detailed examples provided below primarily involve supervised machine learning, it is noted that unsupervised machine learning may alternately or additionally be employed and is intended to be included within claimed subject matter. Likewise, while supervised machine learning approaches are discussed, again, for purposes of illustration, other machine learning approaches may be employed and provide satisfactory results.

The present patent application details an example embodiment of a process to identify network devices by monitoring network communication flows for the network devices to be identified. As suggested previously, in a particular illustrative embodiment, a machine learning approach may be employed, although claimed subject matter is not necessarily limited in scope in this respect. As mentioned previously, this context, it is noted that identifying a network device, including identifying a particular network device, in general, refers to identifying a particular type of network device. For example, as a simple illustration, without intending to limit claimed subject matter scope, if a particular type of nest thermostat joined a network, it is capable of being identified by monitoring network communications, as later described. Thus, while one particular nest thermostat, in this example, joined the network, and, thus, a particular network device is identified in this example, any nest thermostat of that type is capable of being identified. However, it is likewise noted that the foregoing is not intended to exclude a situation where a single particular network device is identified, rather than a particular type of network device, since that situation is also capable of being handled in accordance with claimed subject matter.

Continuing with this illustration, as shown in FIG. 1, for embodiment 100, an illustrative process may entail:

collecting and organizing flow detail records (e.g., samples), shown by 120;

transforming the flow detail records (e.g., samples) into a vector form, shown by 130;

selecting a machine learning model, shown by 140;

training the machine learning model, shown by 150;

testing the machine learning model, shown by 170; and tuning the machine learning model, shown by 115, 160, 180, and 190.

For example, as previously mentioned, in one embodiment of claimed subject matter, as an illustration, a method of identifying a particular network device is described for a particular network device engaging in network communications via a network. Thus, for a period of time, respective network communication flows engaged in by the particular network device are monitored. Thus, network communications, referred to here as network communication flows, in an embodiment, may be collected for a target network device (e.g., a network device to be identified) and other network devices that are not the target network device.

Figure 2:
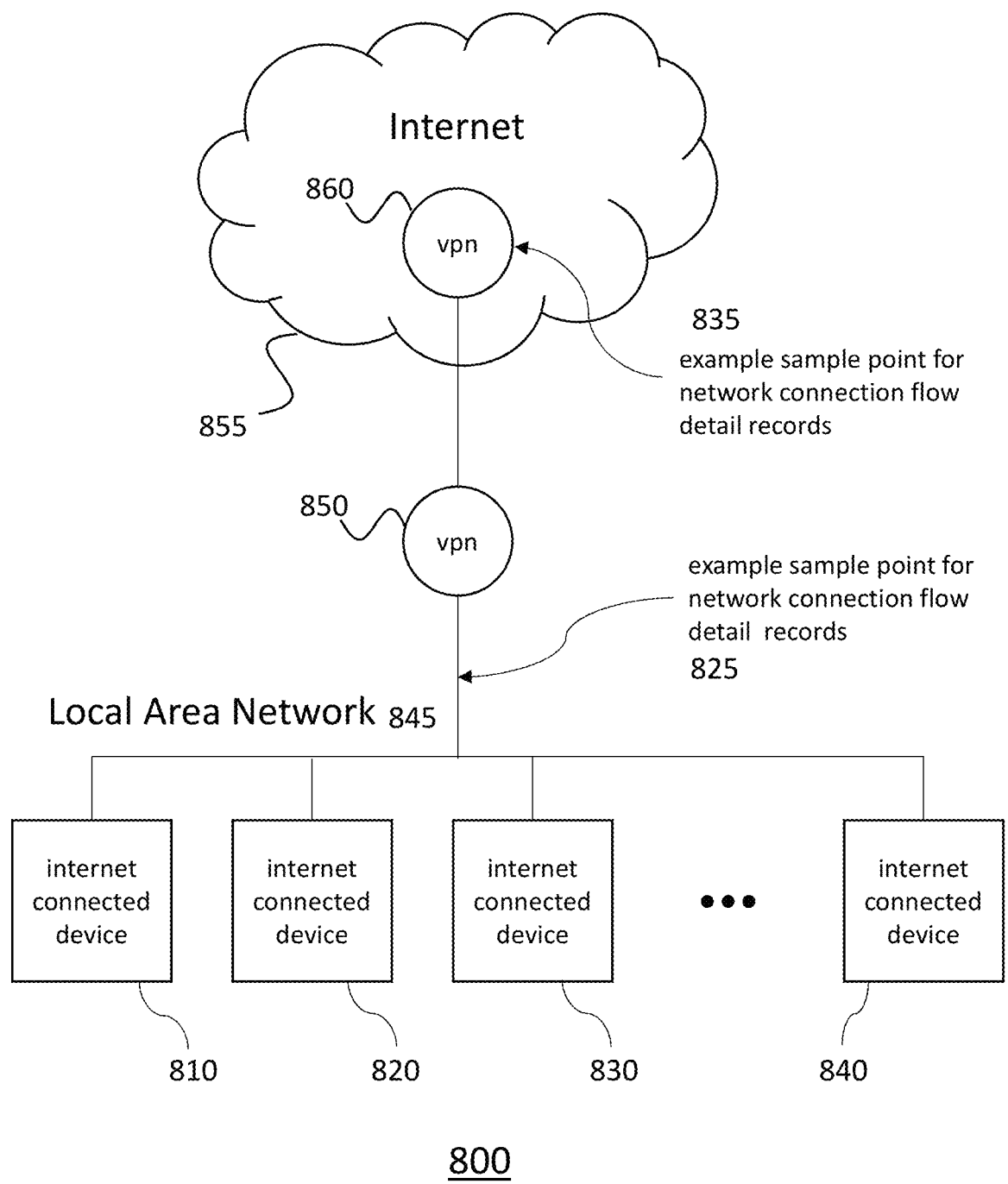
FIG. 2 is a schematic diagram illustrating an embodiment of a known environment for monitoring network communications, such as network communication flows.

For example, network communication flows may be gathered in known environments and labeled as collected. As an example, a router or other network equipment may be employed to capture network flow detail records, which may be labelled, such as by those gathering the flow detail records. Such flow detail records, for example, may be gathered at locations providing access to communications to and from the network devices being monitored, as illustrated in FIG. 2 by 825, for example. It is noted that network communication flows are gathered outside a virtual private network (VPN) which may otherwise be employed, for example, as shown in FIG. 2 by 850 and 860; however, 835 illustrates a location that is integrated with the VPN endpoint and, therefore, is als able to gather flow detail records without VPN encryption.

Specifically, in this context, referring to network communication flows, Internet Protocol (IP)-type network devices communicate over a network by a series of network communications or network transactions referred to in this context as network communication flows. As an illustrative example, a network communication flow may comprise a "five-tuple" of network communication flow parameters that includes:

Source Internet Protocol (IP) Address;

Source Port Number;

Destination IP Address;

Destination Port Number; and

Protocol

Likewise, additional network flow communication parameters may also be collected in connection with a network communication flow to augment the five-tuple above. For example, timestamp, application name, and/or host name may be associated with a network communication flow. A signal sample representation of a network communication flow, in this context, is referred to as a flow detail record. It is likewise noted that the term sample and the term flow detail record are used interchangeably throughout this specification unless otherwise indicated. Thus, flow detail records (e.g., samples) may be captured in connection with a process in which network communication flows are monitored.

Various methods to capture flow detail records are available, such as utilizing a network router to capture network flow communication parameters provided substantially in accordance with an augmentation of Cisco Standard Net-Flow, version 5, version 7, version 8 or version 9, where the augmentation at least includes an identifier, such as server name and/or domain name, for example. In this context, the term identifier refers to a character sequence (e.g., character string) used for purposes of identification of a network attribute related to a network communication flow, such as, for example, an application name, a host name, a server name, a domain name, etc., etc. It is noted that relevant versions of Cisco Standard NetFlow are available from the Internet Engineering Task Force (IETF), such as at https://tools.ietf.org/html/ including, for example, RFC 3954— Cisco Systems NetFlow Services Export Version 9. (The NetFlow protocol itself has been superseded by Internet Protocol Flow Information eXport (IPFIX). Version 9 implementation of NetFlow suggests that IPFIX is on the IETF standards track with RFC 5101 (obsoleted by RFC 7011), RFC 5102 (obsoleted by RFC 7012), etc., which were published in 2008). Likewise, a device that collects connection logs, such as a web-proxy device, may alternatively or additionally be used to capture flow detail records, for example, as records enter or exit network interfaces for the network devices being monitored. Table 1, for example, illustrates an example of a typical NetFlow flow detail record without augmentation; Table 2, likewise, as another example, illustrates a typical NetFlow flow detail record with augmentation. It is noted that these tables and the other tables mentioned throughout this specification are shown in FIGS. 8A-8B.

A series of flow detail records are collected with respect to a particular network device, the records, for example, to be used for training a classifier. The number of records collected may comprise an amount of records feasible within storage space and/or processing time constraints. More records typically generate more precise classifiers.

As flow detail records are collected for a known environment, the records may be sorted based at least in part on the particular network device that generated the records. A label that represents the particular network device may be included with a stored file. During a training phase, stored labels may be used to select sets of flow detail records representing the particular target network device and a mix of non-target network devices. Records as labeled may also be separated into a training group and a testing group. A typical distribution, for example, may comprise selecting 75% of target network device records for training and 25% of target network device records for testing, and may comprise selecting 75% of non-target network device records for training and 25% of non-target network device records for testing. Of course, this is simply an illustrative example of an approach to splitting collected samples for training and testing and claimed subject matter is not limited in scope to this particular approach or even to necessarily splitting a collection of samples between training and testing.

In an illustrative embodiment, labeled samples (e.g., flow detail records) may be transformed into vectors to be processed using a classifier. Respective samples in an embodiment may additionally be labeled with a 1 or 0 for a target network device or non-target network device, respectively. For more effective training, thousands of samples (e.g., flow detail records) may be processed.

A respective monitored network communication flow comprises flow detail records that include a set of network flow communication parameters. Thus, selected network flow communication parameters for the respective monitored network communication flows with respect to a particular network device over a period of time are processed in a time sequenced order, after having monitored a particular number of respective network communication flows for the period of time with respect to the particular network device. A count of the processed network flow communication parameters captured over the period of time is vectorized. Based at least in part on the vectorized count for the particular network device, the particular network device is identified. Of course, again, it is noted that claimed subject matter is not intended to be limited to particular embodiments described primarily for purposes of illustration.

In an illustrative embodiment, processing, in a time sequenced order, selected network flow communication parameters for the respective monitored network communication flows comprises: accumulating and sorting the monitored network flow detail records for the particular network device and other network devices over the particular period of time; and processing the selected network flow communication parameters of the monitored network flow detail records for the particular network device and other network devices over the particular period of time.

Figure 3:
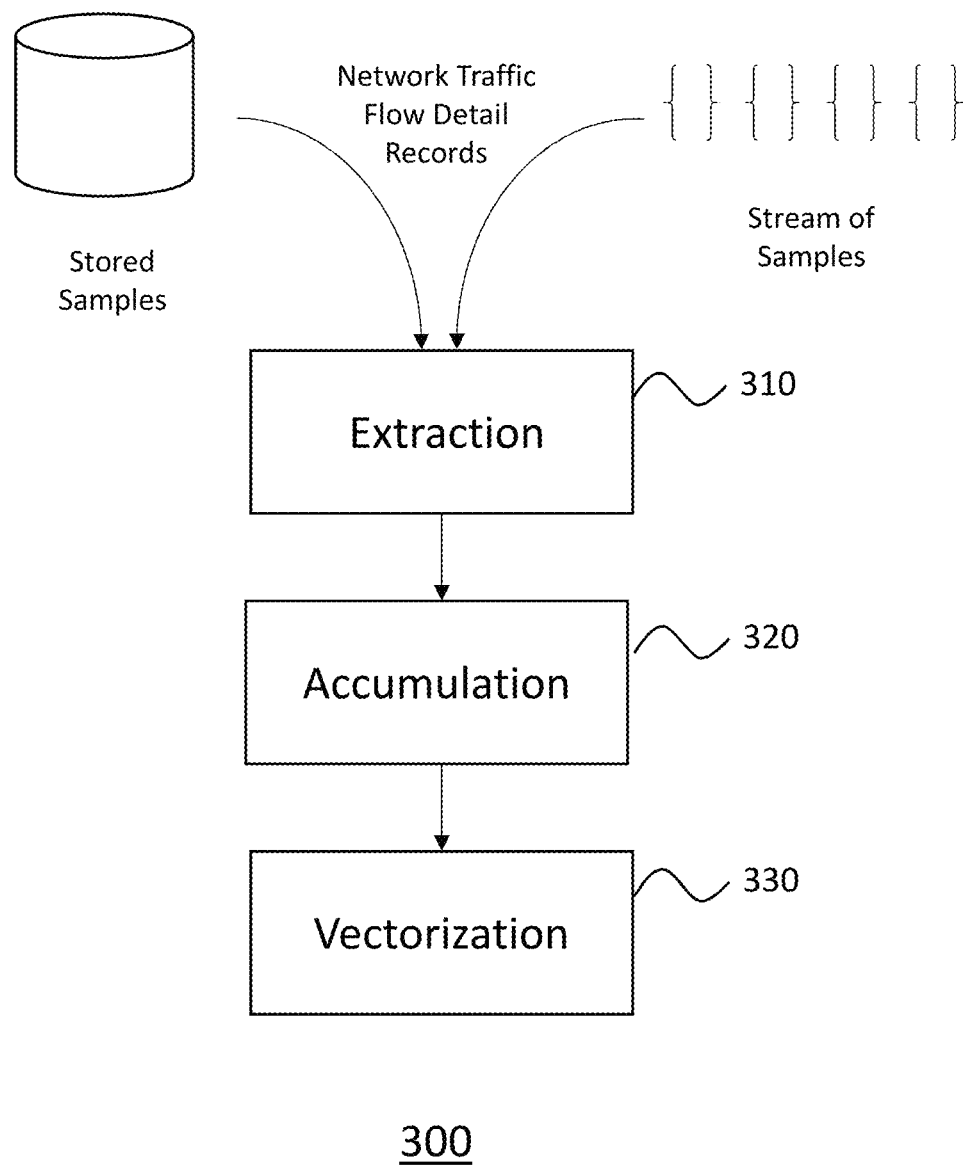
FIG. 3 is a schematic diagram of a portion of one embodiment capable of element extraction, accumulation and vectorization in accordance with claimed subject matter.

Likewise, in an illustrative embodiment, processing which includes transformation of flow detail records may be represented by three stages, as shown in FIG. 3. For example, elements are extracted, as shown by 310, which may include parsing and filtering raw flow detail records down to more concentrated elements. The term element refers to one or more particular character features of a particular communication flow parameter. Thus, an element may comprise one or more characters, such as one or more Unicode characters, one or more UTF-8 characters or any combinations, including any features, thereof. Likewise, groups of remaining elements may be accumulated, shown by 320, into pre-vectorization units (PVUs) and, as shown by 330, PVUs may be transformed into vectors (e.g., vectorized) so that resulting vectors may be processed via machine learning, as shall be described further later. Of course, claimed subject matter is not necessarily limited in scope in this respect. Rather, again, FIG. 3 provides an example for purposes of illustration. For example, other operations may be included in other embodiments. Likewise, some aspects of this illustration may be omitted in other embodiments and/or a particular order of operations may be modified for some embodiments.

Table 3 is an illustrative example after arranging records in chronological order. Elements in a flow detail record may vary depending at least in part on the type of network communications taking place. Likewise, particular elements for network communication flow parameters may vary, for example, by network, by network device under evaluation, and/or set of network devices under evaluation. Thus, some elements may be more meaningful than others for training a classifier to identify a network device. In general, however, relative usefulness of an element to train a classifier to identify a network device typically may be related to its frequency with respect to network communications involving the particular network device relative to its frequency with respect to network communications amongst a large variety of network devices in a large variety of networks.

For example, a flow detail record may include an IP address, as described in the RFC1918 specification address space for private IP addresses. This, however, implies that IP address is likely to vary from one environment to another. Therefore, it may be, relatively speaking, less meaningful for identifying a particular network device across a variety of potentially different networking environments. Another example may be a domain name commonly used. If a record contains a domain name, such as "somedomain.com," the ".com" component may be relatively less meaningful for purposes of identifying a particular network device because it may not be sufficiently distinctive within general network communications. Thus, for the present illustration of an implementation, for example, neither IP addresses nor port numbers and protocols are considered sufficiently meaningful or distinctive for use in identifying a particular network device. In contrast, however, applications may, relatively speaking, be more meaningful or distinctive in terms of assisting in identifying a particular network device. Generally, specific names assist in identifying a particular network device and typically are employed; however, network time protocol (NTP) is generally not sufficiently distinctive so, for the present illustrative example, it is not employed. While timestamps are useful for sorting, timestamps generally do not provide features that make them meaningful with respect to identification of a particular network device. In an embodiment, therefore, such as the foregoing example, elements that provide qualitatively less value with respect to identification are filtered so that remaining elements qualitatively provide greater value with respect to identification. In this context, a low or a relatively low qualitative value for identification of a particular network device with respect to elements or sub-elements of network communication flow parameters refers to a relatively small marginal increase, if any, in accuracy of an otherwise satisfactorily performing classifier by including the particular element or particular sub-element relative to omitting the particular element or particular sub-element. As simply an illustration, for an embodiment, an example of a small marginal increase, if any, may comprise an increase from no marginal increase up at about a 5% marginal increase, although claimed subject matter is not necessarily intended to be limited in scope in this respect. As an illustration of element extraction (e.g., filtering), Table 4 shows the flow detail records from above after employing filtering, as described above.

As elements are processed further, substrings may also be assessed to ascertain a degree of meaningfulness with respect to identification, such as numbers, dashes or other special characters, relative to other characters or elements around them, for example, that may otherwise be relatively more meaningful. For example, if network communication flow parameters show communication with multiple Domain Name System (DNS) names, such as appserver-1.somedomain.com, appserver-2.somedomain.com, and appserver-3.somedomain.com, then the numerical components "1", "2", "3" and the "-" marginally appear to be less meaningful relative to the "appserver" component of the communication flow parameter. Therefore, again, elements and/or sub-elements that qualitatively provide less meaning at least regarding identification of a particular network device (including ".com", for example) may be removed resulting in "appserver somedomain."

In general, as more records are processed, those elements and/or sub-elements that are less meaningful with respect to identification of a particular network device may become more certain and may be extended. As more samples of various types are used for generating additional machine-learning classifiers, results may be examined to continue to evaluate elements and/or sub-elements that appear in network communication flow parameters. Those that appear to be relatively common, such as ".com," or highly variable, such as RFC1918 address, may be added for filtering of network communication flow parameters so that processing excludes such additional elements and/or sub-elements. Likewise, this approach may be repeated several times, for an embodiment.

In an embodiment, processing selected network flow communication parameters comprises processing remaining selected network communication flow parameters after removing at least one of the following from the selected network communication flow parameters: .com, .net, .org, www, example, time, ntp, pool, digits 0-9, dashes, or any combination thereof. In this illustrative implementation, therefore, we have specifically filtered out:

.com, .net, .org, www, example, time, NTP, pool digits 0-9 dashes

Table 5 is an illustration of further filtering reduction as described above, for an embodiment.

In an embodiment, processing selected network flow communication parameters of monitored network flow detail records for a particular network device and other network devices over a particular period of time includes: identifying in the flow detail records any characters or other elements that occur with a relatively high-frequency compared with remaining characters or other elements of the flow detail records; iteratively evaluating the effect on accuracy of a classifier of filtering from selected network flow communication parameters the identified characters or other elements; and extracting from selected network flow parameters identified characters or other elements for which evaluation of filtering thereof indicates an improvement in accuracy. As simply an illustration, for an embodiment, an example of a relatively high frequency compared with remaining elements or characters may comprise three-to-five times more frequent or even higher, although claimed subject matter is not necessarily intended to be limited in scope in this respect. Thus, identifying elements and/or sub-elements to be extracted may, in an embodiment, be performed without human intervention, for example, by searching a large set of flow detail records for elements that occur with a high frequency across all network devices that have been sampled. A loop could be employed to iteratively test effects of filtering the candidate elements and/or sub-elements. If removing the elements and/or sub-elements results in better classification accuracy, those candidate elements and/or sub-elements are included in a list of elements and/or sub-elements that are to be extracted before further processing.

Accumulation, shown in FIG. 3 as 320, may, for an implementation, include tracking how many records have been processed and combining elements that remain after other elements and sub-elements have been extracted to form one or more "Pre-Vectorizer Units" or "PVUs", perhaps of a prescribed size, for example, in an embodiment. Thus, after being filtered, flow detail records may be concatenated together. The number of flow detail records to concatenate for a single PVU comprises a tunable parameter with respect to a classifier to potentially improve performance. An objective, for example, may include to reduce a number of flow detail records in a PVU (referred to as PVU size) while improving accuracy of a classifier during testing. Table 6 illustrates a PVU size of 2 and Table 7 illustrates a PVU size of 3. For the present illustration, PVU size typically was between about 5 and about 50.

Vectorizing a count of processed network flow communication parameters comprises vectorizing one or more formed pre-vectorization units (PVUs). After being sorted, filtered and grouped into PVUs of a specified size, as suggested for an embodiment, vectorization may take place.

In an embodiment, for example, vectorizing one or more formed PVUs comprises: identifying within the one or more formed PVUs for a particular network device and other network devices, over a particular period of time, a number of instances of respective selected network flow communication parameters; counting within the one or more formed PVUs for the particular network device and the other network devices over the particular period of time the number of instances of the respective selected network flow communication parameters; and weighting the count of the number of instances of the respective selected network flow communication parameters within the one or more formed PVUs for the particular network device and the other network devices over the particular period of time.

Thus, during a training process, flow detail records may be collected and processed to produce PVUs for a large number and variety of devices, limited primarily by storage and/or processing time. By grouping text segments (e.g., character strings) into PVUs, a "bag of words" type situation has been constructed, in an embodiment. Thus, for example, in an implementation, a term-frequency-inverse-document-frequency (tfidf) process may be used to convert PVUs into a vector of normalized, floating point signal sample values.

For example, for an embodiment, a term-frequency operation comprises counting the number of times a distinct element appears within a PVU. For purposes of illustration, a computation for an embodiment may be substantially in accordance with the following relation:

$$tf(e,p) = f_{e,p}$$

and where the following nomenclature is employed:
e: element
p: PVU
$f_{e,p}$: count Likewise, a process may further weigh elements by a function of frequency across the PVUs for a training set, so to speak. In an embodiment, weights may be computing using a logarithmically scaled inverse fraction of PVUs that contain the particular element substantially in accordance with the following relation:

$$idf(e, D) = \log \frac{N}{|\{p \in D : e \in p\}|}$$

and where the following nomenclature is employed:
e: element
p: PVU
D: training set of PVUs
N: number of PVUs in the training set N=|D|
$\{p \in D : e \in p\}$: number of PVUs where element e appears One interpretation may be that this provides a measure of distinctiveness. Thus, a normalized, weighted signal sample value may, therefore, in an implementation, be computed substantially in accordance with the following relation:

$$tfidf(e,p,D) = tf(e,p) \cdot idf(e,D)$$

Figure 4:
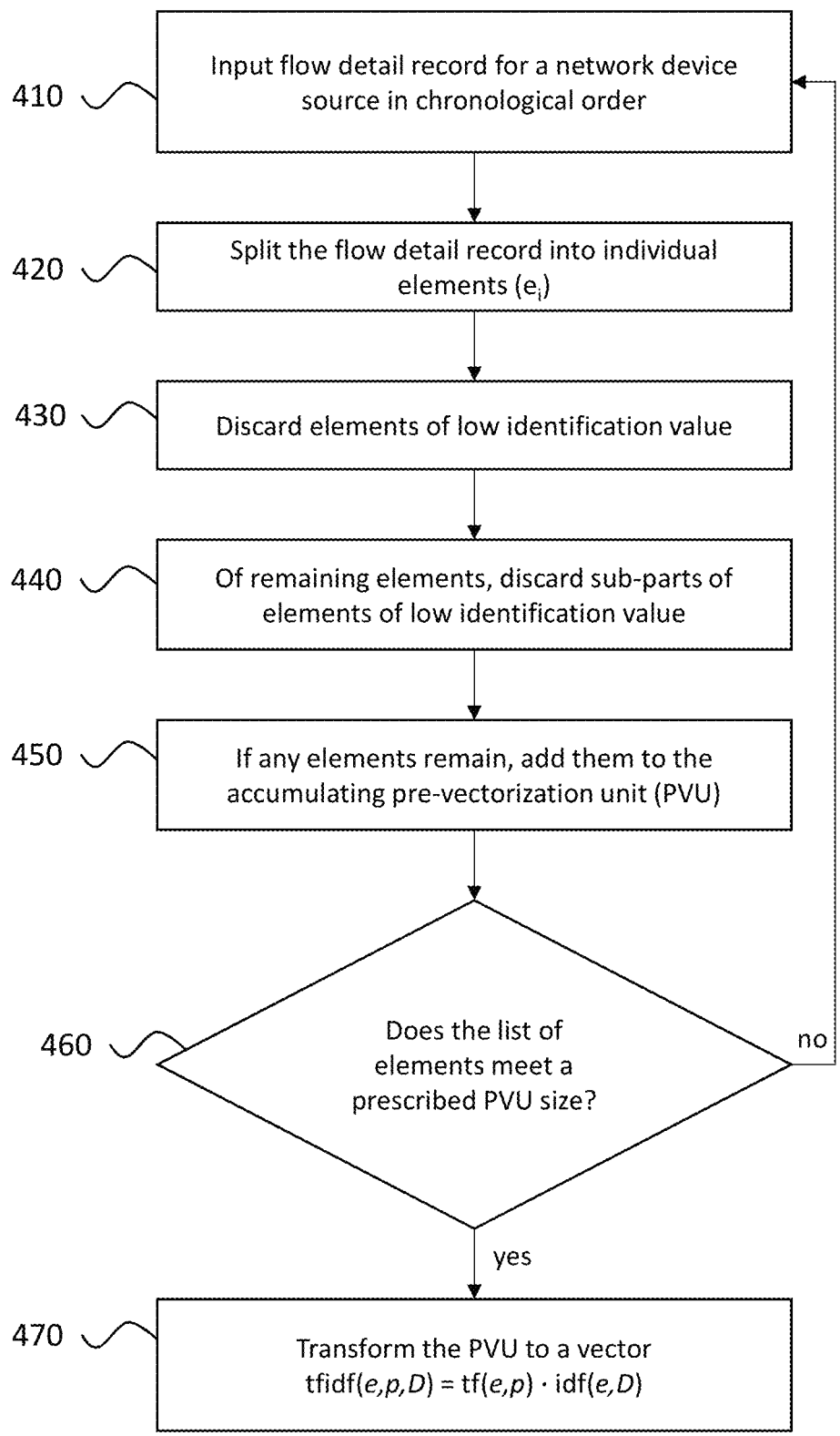
FIG. 4 is a flowchart of one embodiment of a process to vectorize flow detail records in accordance with claimed subject matter.

FIG. 4 is a flowchart showing the previously described illustrative embodiment, 400, which includes operations 410, 420, 430, 440, 450, 460 and 470, such as previously described. It is noted, of course, that other forms of term weighting may also be used, which may, for example, be combined with the foregoing in an embodiment to potentially improve accuracy.

In an alternate embodiment, for example, the following methods may be included together or separately, although, again, claimed subject matter is not limited in scope to these illustrations. In an embodiment, for example, a method may involve creation and maintenance of a database of device and manufacturer names with correspondingly assigned factors or multipliers. Names in the database may be sourced through market research, for example, and factors may be calibrated manually based at least in part upon training accuracy results. Thus, in an embodiment, for an element appearing in the database, weighting may be scaled by a multiplier associated with the name in the database. Likewise, in another embodiment, publicly available search engines, for example, may be employed with respect to elements embedded within websites of known device manufacturers or known device marketers to estimate a measure of potential relevance of a given element with respect to devices manufactured by that known device manufacturer or with respect to devices marketed by that known device marketer. For example, the word "Nest" is prominent on the website for nest.com. Therefore, the element "nest" would be scaled by a weight to reflect a more likely association (e.g., assigned a multiplier greater than 1) as a possible indicator of a device manufactured by the company Nest Labs, Inc.

As previously alluded to, sample sets (here, a vectorized PVU), in an embodiment, may tend towards linear approaches, such as, for example, linear support vector machines, described, for example, at https://en.wikipedia.org/wiki/Support-vector_machine, or logistics regression, described, for example, at https://en.wikipedia.org/wiki/Logistic_regression. Likewise, in another embodiment, one could also implement a tensor flow representation for a neural network approach, illustrated later. However, for the present illustration, logistic regression is employed, having features that typically should include relative simplicity and relative effectiveness with respect to results.

In general, linear models attempt to form a separation between two clusters of processed sample sets and produce a matrix of weights and a vector of biases to be employed with respect to a processed sample set, as shown below, to predict a preferred fit vis-à-vis the clusters. It is noted, here, that a processed sample set comprises a vectorized PVU. Logistic regression is similar to a linear support vector machine; however, a logistic function curve (e.g., log) rather than a linear curve is employed to compute a probability score on the range of 0.0 to 1.0. It is noted, again, that this is an illustrative example and it is not intended that claimed subject matter necessarily be limited in this respect.

Likewise, for an embodiment, the scikit-learn python libraries for Logistic Regression may be employed, as documented at https://scikit-learn.org/stable/modules/generated/sklearn.linear_model.LogisticRegression.html; however, again, claimed subject matter is not intended to be limited in this respect. For purposes of illustration, a Logistic Regression scikit class was implemented with existing default parameters and without any customization, such as tuning of a regularization parameter, for example. Thus, for this illustrative example, a linear computation may take place substantially in accordance with the following:

$$\omega = [\omega_1, \omega_2, \omega_3, \ldots \omega_n]$$

$$x = [x_1, x_2, x_3, \ldots x_n]$$

$$y = \sum_{i=1}^{n} \omega_i x_i + \beta$$

and where the following nomenclature is employed:
y: prediction
x: vectorized PVU
ω: computed coefficient weights
β: computed bias
n: number of elements
$x_i$: $i^{th}$ element
$ω_i$: $i^{th}$ element weight After flow detail records have been converted to vectors, grouped with respect to target network device and non-target network devices, separated into a training set and a test set, and a machine learning approach has been selected, then training a classifier may occur. A training process is intended to train a classifier in a "one vs the rest" approach in which sample sets (e.g., vectorized PVUs) from many different sources are labeled either as 1 (designating the target network device) or 0 (designating a network device that is not the target network device). In general, it is desirable for non-target network device vectorized PVUs to include a large variety of network devices to represent situations that might be encountered following deployment in an operational environment. Thus, for training, labeled vectors are passed to a classifier, which results in a matrix of weights and a vector of biases, referred to as a model, as previously described.

With use of the scikit-learn libraries, transformed vectors and associated labels may be passed into a "fit" operation and a trained classifier may be tested to determine classifier accuracy. For example, Table 8 includes sample pseudo-code for classifier testing. Likewise, after a model is trained, it is desirable to also test it to assess effectiveness. As was described, we use a subset of 25% of the initial collection for testing by transforming sets of samples into vectors as had been done previously to train the classifier. Likewise, the classifier is employed to get prediction results from the transformed vectors. Prediction results are then compared to expected labels for the transformed vectors. A ratio of correct results to incorrect results is employed to measure accuracy for the trained classifier. Thus, using the scikit-learn libraries, a test set and labels are passed to a "score" operation to compute accuracy of the trained classifier. Table 9 provides sample pseudo-code for such a computation.

For an implementation, for example, an accuracy score greater than 90% is considered acceptable, although claimed subject matter is not intended to be limited in this respect. If it is less than 90% then, for this illustrative embodiment, process tuning takes place to improve accuracy.

Several options exist to improve an accuracy score, if, for example, it falls below 90%, including:
increase PVU size;
collect more samples; and/or
employ a different model.

Insufficient accuracy may be interpreted to mean that a wider separation of the two clusters is desirable.

Larger PVU sizes result in vectors that contain more samples for an individual vector. In operation, however, smaller PVU sizes are appealing because, for a larger PVU size, it may take more time to collect sufficient samples to generate a PVU. For the example described, a PVU size of 5 was tried and then increased in increments of 5 up to 50. Based on experimentation, PVU sizes beyond 50 appear to produce limited improvements to accuracy.

If increasing PVU size does not produce satisfactory results, another option may be to train a classifier with more sample variety (e.g., more records from a wider variety of network devices) in order to improve accuracy. However, if a higher accuracy score remains desired despite the two previous ways to attempt to improve accuracy, different machine learning approaches may be used as another way to attempt to improve prediction accuracy. Notably, vectorized PVUs do not change in this situation because different models are to be used for comparison to a known result. Thus, results between different models may be compared to select an approach that results with a better accuracy than alternatives.

As suggested previously, a logistic regression classifier is not the only possible approach. One could also use a Deep Neural Network (DNN) implemented with the Tensor Flow library, for example. A DNN model would employ samples, as before, such as using a common source, and employ vectorization of the samples, but then, process vectorized PVUs with a multi-layer Tensor Flow Perceptron to produce classification results, as shown, for example, by embodiment 500 in FIG. 5.

An embodiment of one specific configuration, known to produce a functional classifier, comprises a 3-Layer network with rectified linear unit (ReLU) activators at respective layers with dimensions, as provided below, for example. A gradient descent process with 2000 training iterations may be employed to produce a trained DDN classifier.

Figure 5:
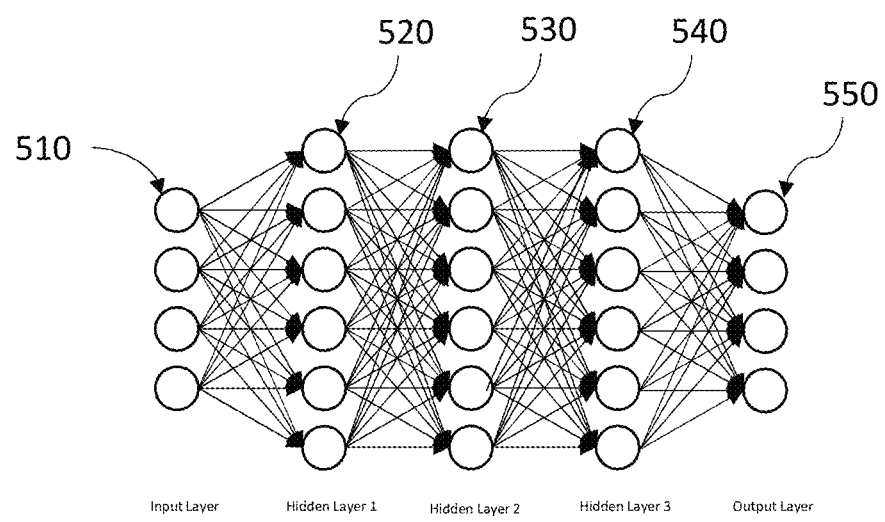
FIG. 5 is a diagram of an embodiment of a multi-layer deep neural network (DNN) in accordance with claimed subject matter.

As shown in FIG. 5, embodiment 500 includes a first layer, 510, sized, for example, for an input vector. A second layer, 520, comprises Hidden Layer 1 with 1200 neurons. A third layer, 530, comprises Hidden Layer 2 with 800 neurons. A fourth layer, 540, comprises Hidden Layer 3 with 400 neurons. Likewise, a fifth layer, 550, is sized for the number of classifications being trained.

After a classifier, whether a logistic regression classifier, a support vector machine or a DNN model, is tuned to an acceptable level of accuracy, it may be used in operation for real-time identification of unknown network devices. For example, in an embodiment, communications of a network (e.g., communication network flows) may be monitored for an addition to a network of a network device. A system, therefore, may collect flow detail records as samples, transform the records, employ a set of trained operational classifiers and determine labels based at least in part on classifier results.

As is the case for collecting training samples, evaluation samples may be collected from locations in a network that provide access to communications to and from network devices, as was shown in FIG. 2. Typically, real-time network communications are collected, as opposed to stored samples; however, either or both may be employed. Operational flow detail records may be collected in the format specified previously; although claimed subject matter is not limited in scope in this respect.

In this example, as samples (e.g., real-time flow detail records) are collected, PVU segments are created and accumulated over time. It is noted that respective operational classifiers may employ a specified PVU size, as discussed previously. Thus, as accumulated PVUs meet or exceed a size for a particular trained classifier, those PVUs may be converted to a vector, as previously described, for this illustration.

After PVUs for an unknown network device have been processed (e.g., transformed) a prediction may be made. Again, continuing with the previously described illustration, the scikit-learn Logistic Regression classifier has two options for making a classification prediction. One is called "predict" and the other is called "predict_proba". The "predict_proba" operation provides an estimate of certainty along with a classification. Table 10 illustrates an implementation of a prediction with a previously trained classifier (clf).

A prediction value is the result of a process for identifying a network device, such as the illustrative example previously described. A prediction value of 0.5 or greater means that the classifier has concluded that the sample set (e.g., vectorized PVU) is from a network device for which the classifier was trained and a value below 0.5 means that it is concluded to not be from a network device for which the classifier was trained. A result may range from a value of 0.0 to 1.0, where the greater the value, the more likely the sample set (e.g., vectorized PVU) is from the target network device, and conversely, the lower the value, the more likely the sample set (e.g., vectorized PVU) is not from the target network device. Thus, a set of classifiers that have been trained for a variety of network devices shall all process the sample set (e.g., vectorized PVU) and make a prediction as to whether the sample set (e.g., vectorized PVU) is from a network device for which the respective classifiers were trained.

Collection, transformation, and prediction processes continue until all classifiers have made a prediction. Results of respective predictions are compared to find the largest prediction. If the largest prediction is greater than 0.90 (90%), then the prediction is accepted. If more than one classifier is greater than 90%, then the classifier with the highest value is used and the network device is labeled by that classifier and the result is saved in a database for future reference. If none of the classifiers reach a prediction value greater than 0.90, then the collection process begins again and repeats until at least one classifier successfully identifies the network device with a prediction value greater than 0.90. It is noted that at a time in which computational load is detrimental, a timer may be inserted into the repeating process to delay restart of collection and reduce computation load. After a certain number of repeated attempts, if still no classifier identified the network device with a prediction value greater than 0.90, the process may be halted. This may indicate that a network device for which no classifier has been trained has joined the network. For an alternate embodiment, perhaps, for example, unsupervised learning may then be employed using a database of results to look for similarities between vectorized PVUs from the unidentified network device and vectorized PVUs for network devices that are known.

Periodically and/or a-periodically retraining one or more machine learning classifiers may also occur while a set of classifiers is operational. For example, in an embodiment, retraining of one or more machine learning classifiers comprises: monitoring for a period of time respective network communication flows engaged in by a selected particular network device and other network devices. A respective monitored network communication flow may comprise flow detail records that include a set of network flow communication parameters, as before. Processing may take place, in a time sequenced order, of selected network flow communication parameters for respective monitored network communication flows with respect to a selected particular network device and other network devices for the period of time. Likewise, vectorizing make take place of a count of processed network flow communication parameters captured over the period of time, after having monitored a particular number of respective network communication flows for the period of time with respect to the selected particular network device and the other network devices. Thus, for an embodiment, in operation, training and testing phases may be repeated, without human intervention, as more flow detail records are collected. If additional testing and training results in more accurate classifiers, then current classifiers may be updated in place, thereby potentially continually improving accuracy for discovering new network devices.

Figure 7:
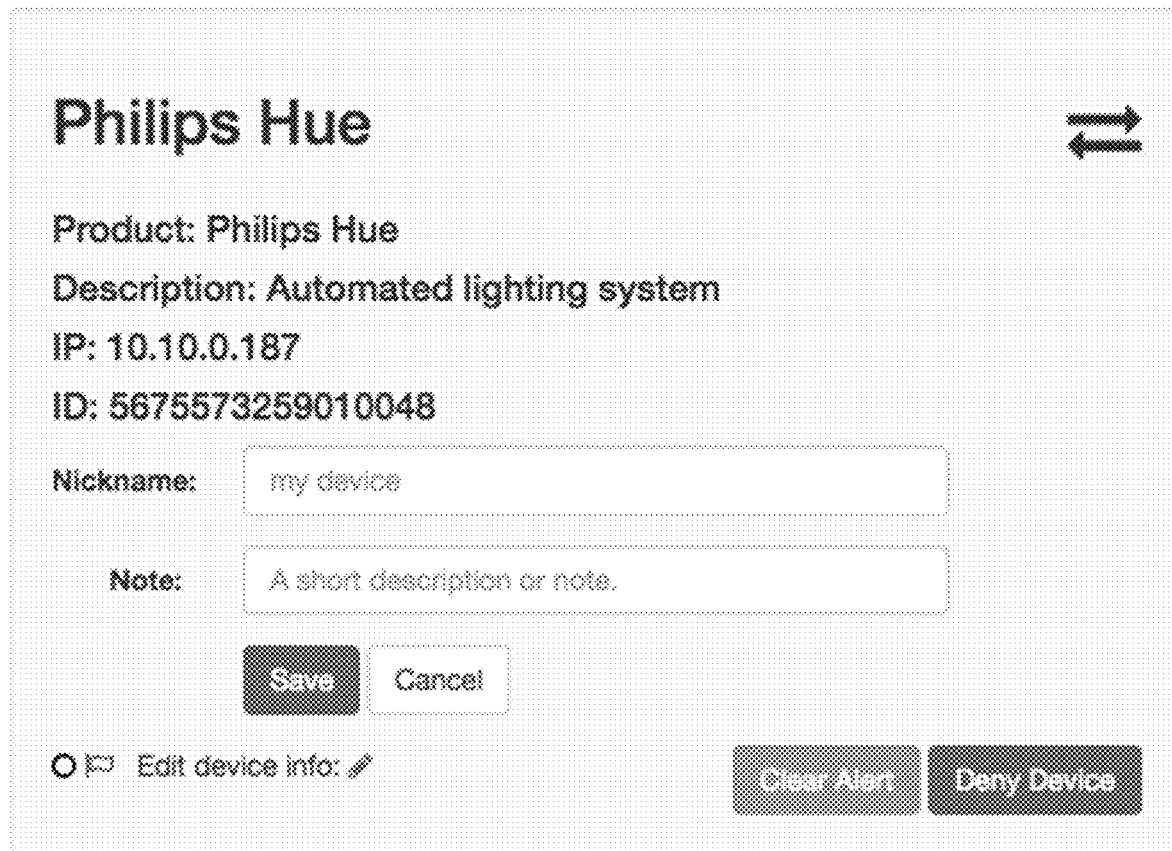
FIG. 7 is an example of a graphical user interface (GUI) that may be employed in connection with an embodiment of claimed subject matter.

In an embodiment, operational classifiers may also collect content from customers to enhance classification. For example, customers may have an opportunity to provide custom labels and descriptions for any network device, such as via a user interface, such as the example embodiment shown in FIG. 7. These labels and descriptions may provide further details in the form of character strings (e.g., text) capable of being processed during later training and testing phases, in an embodiment, for example. Labels, such as provided by customers, for example, may be used to improve accuracy of an existing classifier by indicating that some character strings should be given a higher weighting. For example, assume a customer labels a device with the character string "rachio." It is noted that future versions of a classifier may look for that character string within a PVU and amplify a weighting to be assigned to a PVU that includes the character sting. In another example, a network device may be unrecognized by the current classifiers. Thus, a customer label may then be used to identify the particular network device, which shall, in an embodiment now be trained at least in part based on labels and description from the customer.

Figure 9:
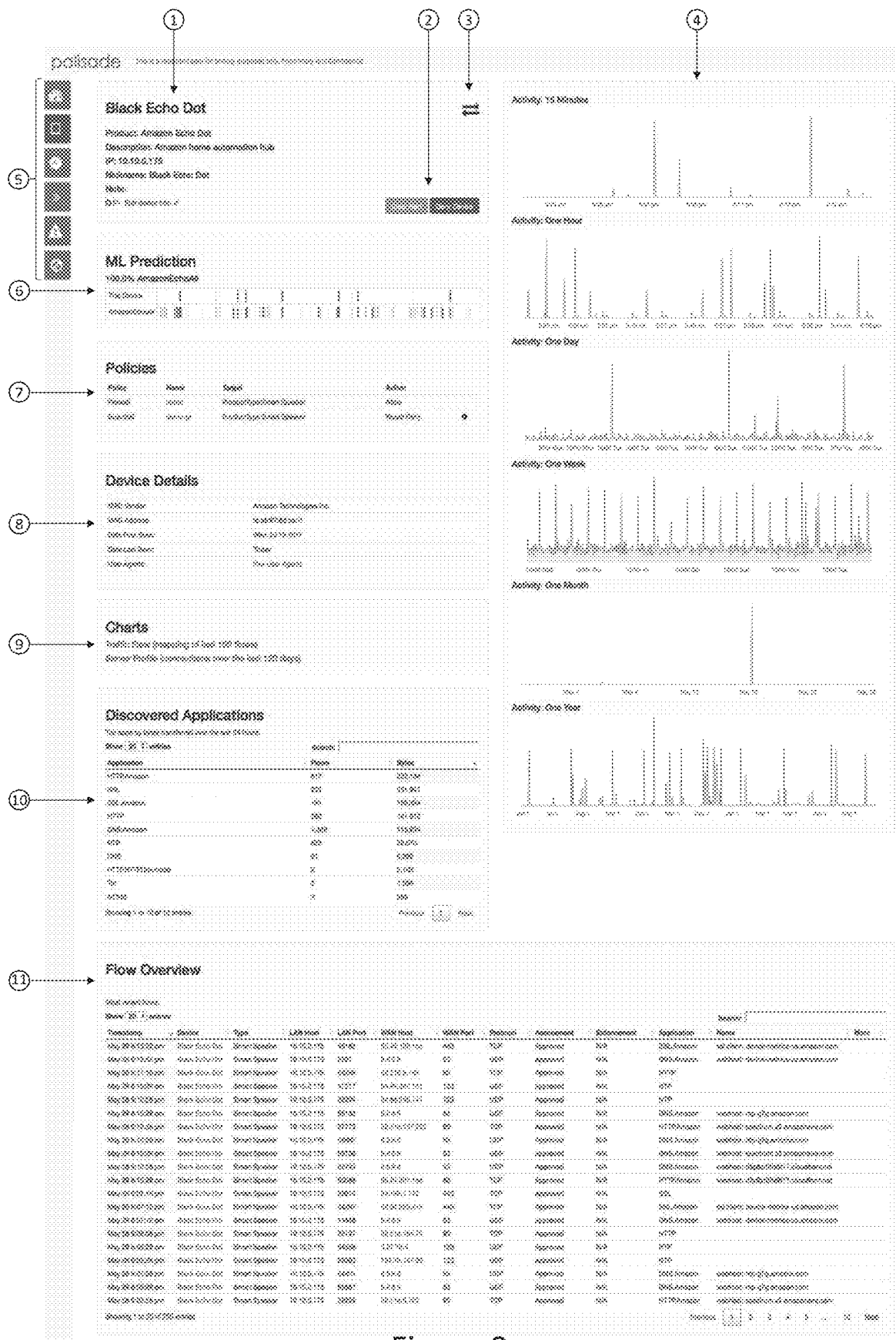
FIG. 9 is another example of a graphical user interface (GUI) that may be employed in connection with another embodiment of claimed subject matter.

FIG. 9 illustrates an example embodiment 900 of a graphical user interface (GUI) that may be employed in connection with an embodiment of claimed subject matter. Of course, this is simply an illustrative example and claimed subject matter is not limited in scope to this particular example. Section 1 illustrates a device identification portion that may display common identifiers for a network device and is intended to provide a user with easily recognizable aspects of a network device, such as type of device, description, IP address and/or user-provided nickname. A user may add or modify a nickname and/or provide a note regarding a network device. Section 2 illustrates quick action buttons for possible actions with respect a network device that may be frequently used and/or for which easy or quick access may be desirable. The two buttons shown include a button to clear an alert state if a network device is in an alert state and a "Deny Device" button to set up a firewall policy to deny access for a network device. Section 3 illustrates a policy state indicator capable of changing to reflect a currently active policy, such as to allow or deny internet access for a network device. Section 4 illustrates real-time activity charts to indicate for a user volume of traffic between a network device and the internet. Multiple charts with different time spans may be provided so that a user is able to see, at one time, details of current traffic and context over time. Section 5 illustrates user interface (UI) navigation tabs on the left side for a user to navigate to other features that may be included with a product offering. Section 6 illustrates a prediction resulting from classifiers, as previously described. The section also illustrates a visualization of vectorizations calculated for a network device, described in more detail below. Likewise, this section may illustrate similarity of a network device to other known network devices via a comparison of visualizations. As explained below also, darkness of vertical lines in the visualization corresponds to relative significance of characteristics that the vertical line represents. Section 7 illustrates that a user may be permitted to configure policies to control if a network device has access to the internet. The policies are configured on a different tab (not shown) but are summarized in this section for the particular network device being displayed. Section 8 illustrates some additional details about a network device, such as date first detected on the network, mac address, and vendor associated with the mac address, as examples. Section 9 provides links to more detailed charts and tables related to the particular network device being displayed. Section 10 illustrates that applications and protocols that have been observed for a particular network device may be displayed. Section 11 illustrates a flow overview table that is able to list most recent flows recorded for a particular network device being displayed, along with augmentation about the flow, such as if it was considered normal traffic or if it was considered abnormal.

Figure 10A:
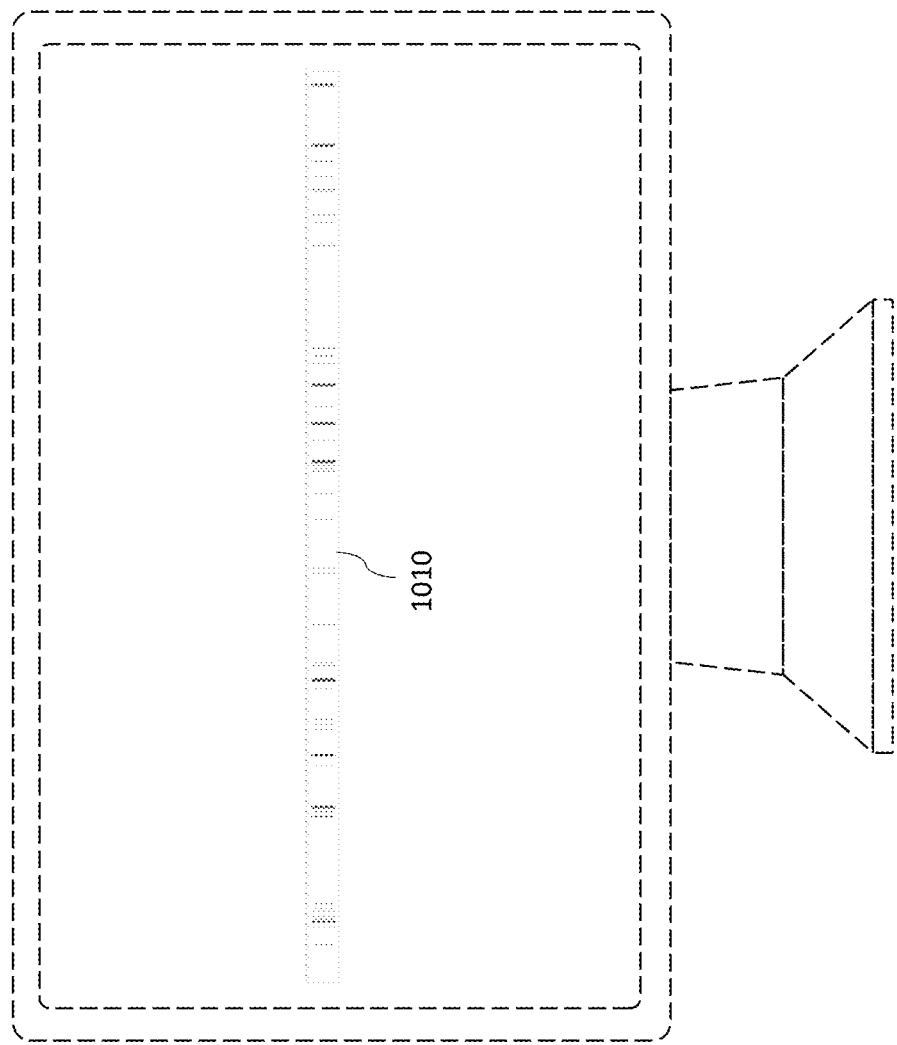
Figure 10B:
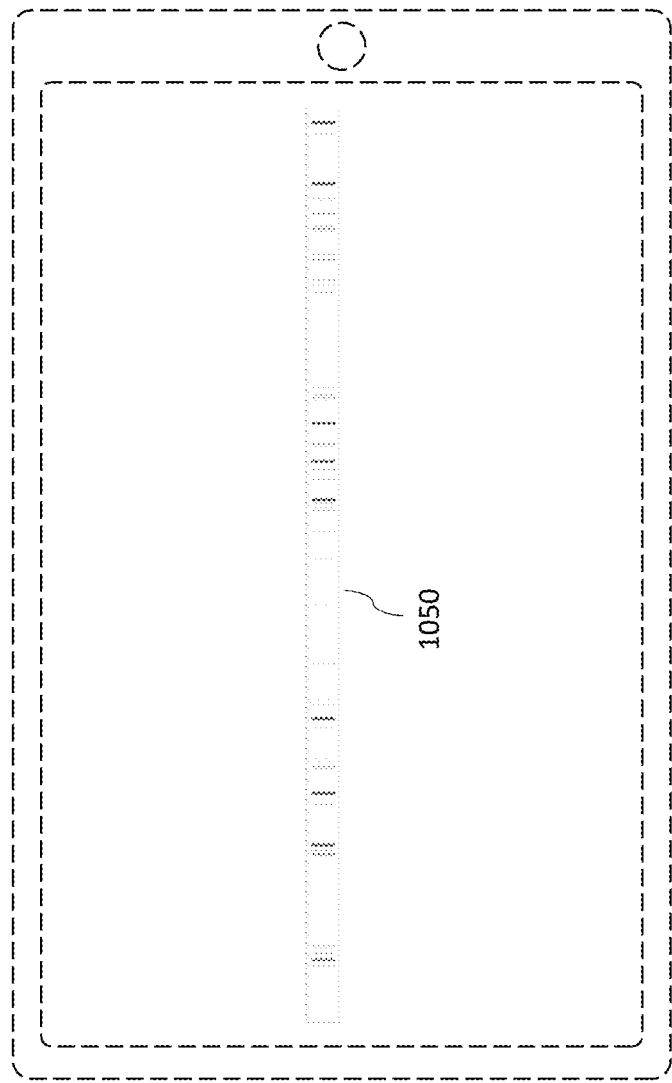
Figure 10C:
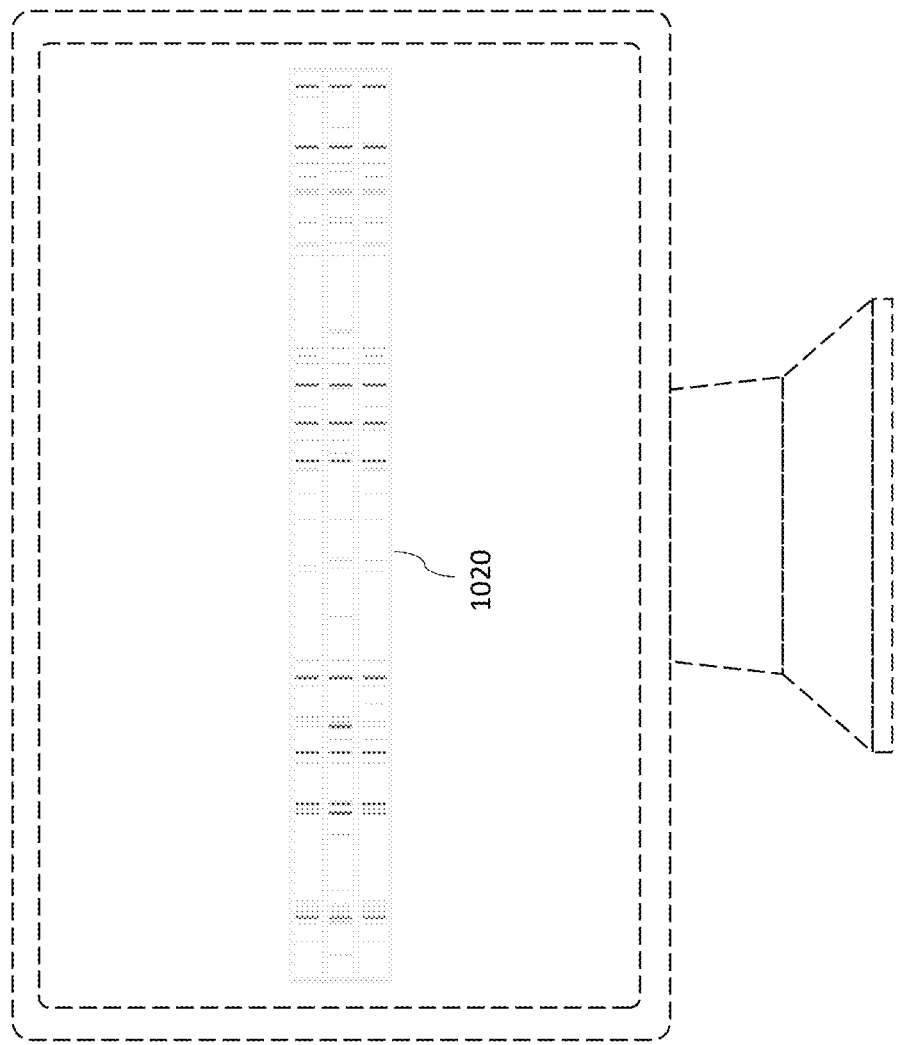
Figure 10D:
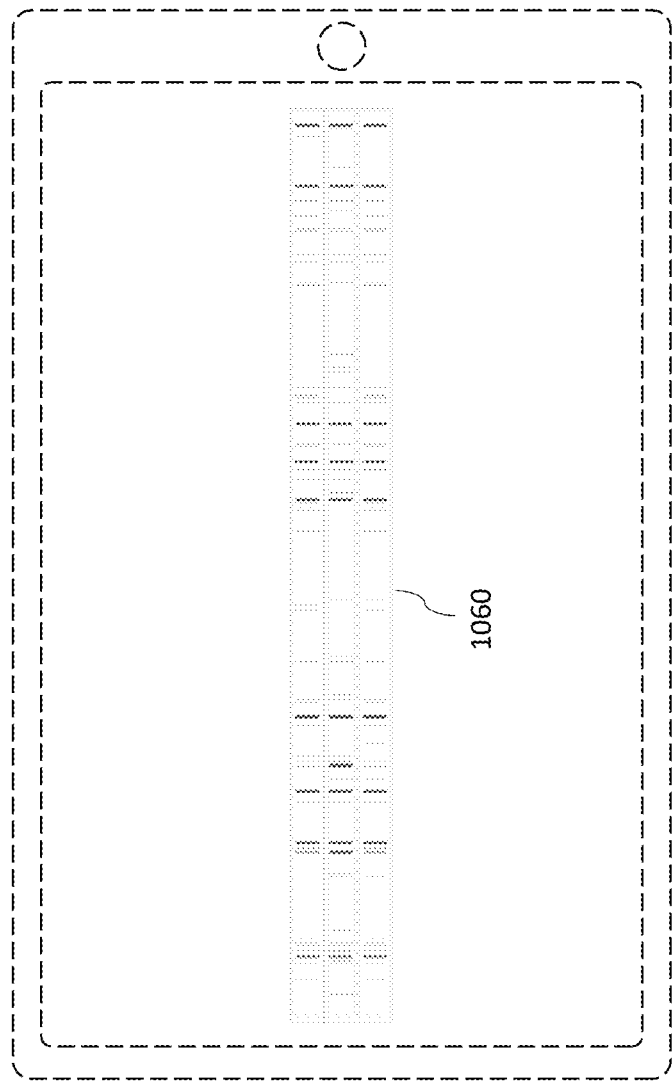
Figure 10F:
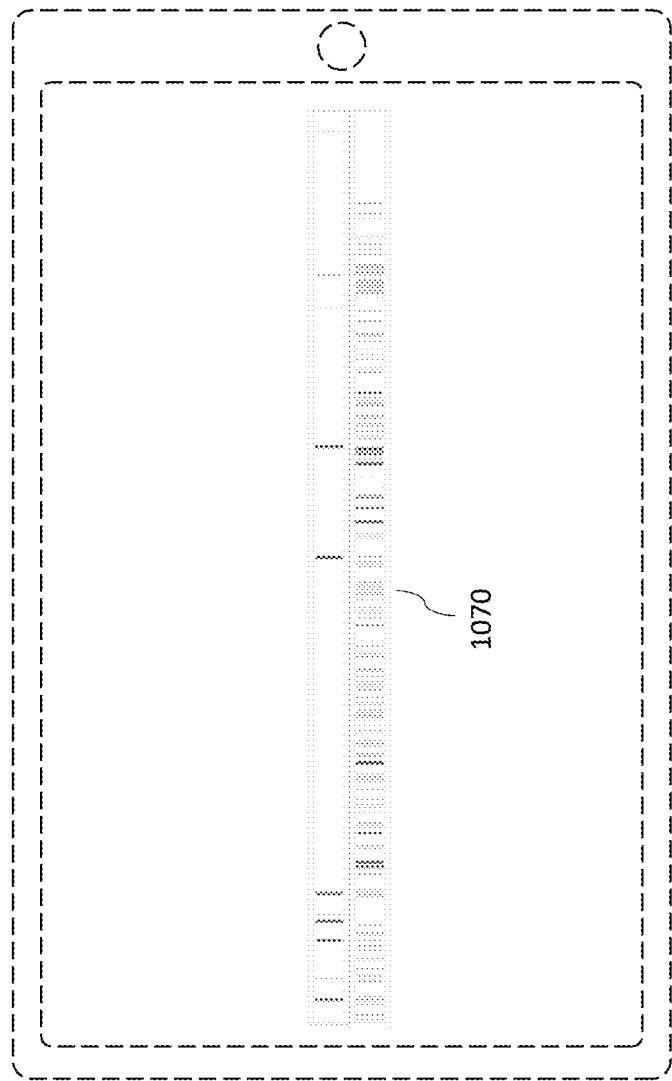
Figure 10G:
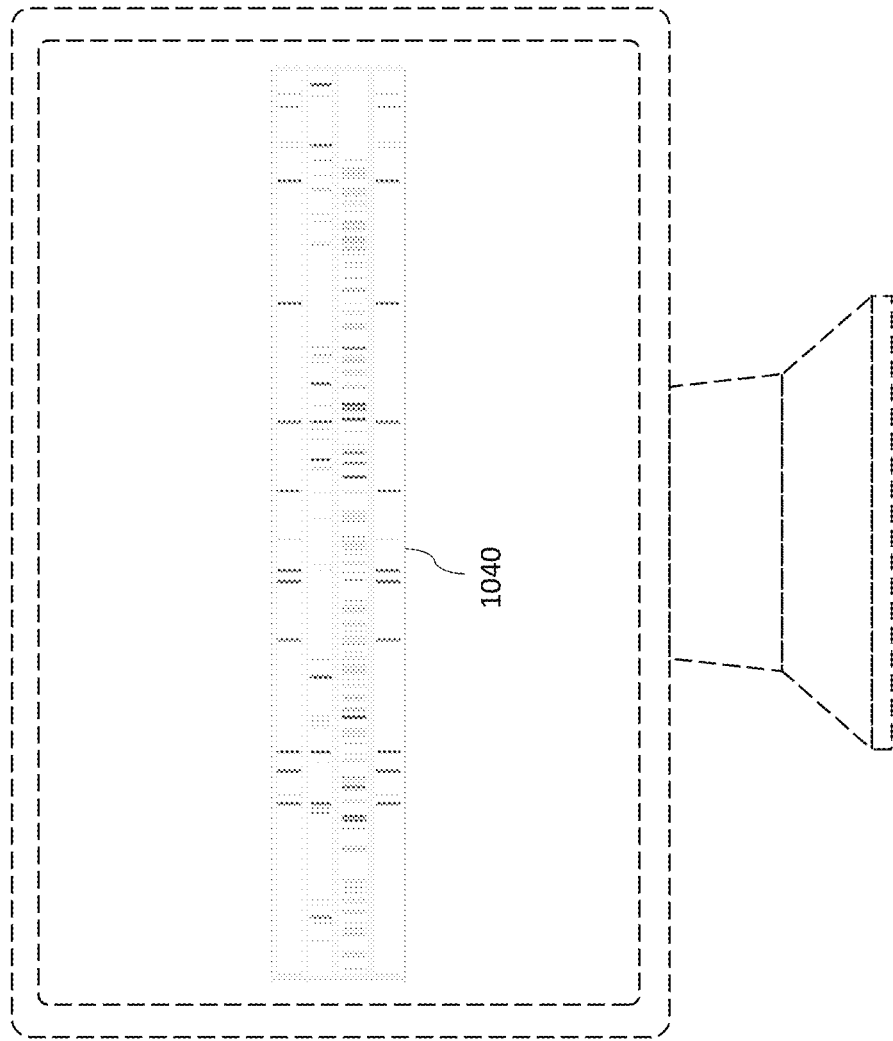
Figure 10H:
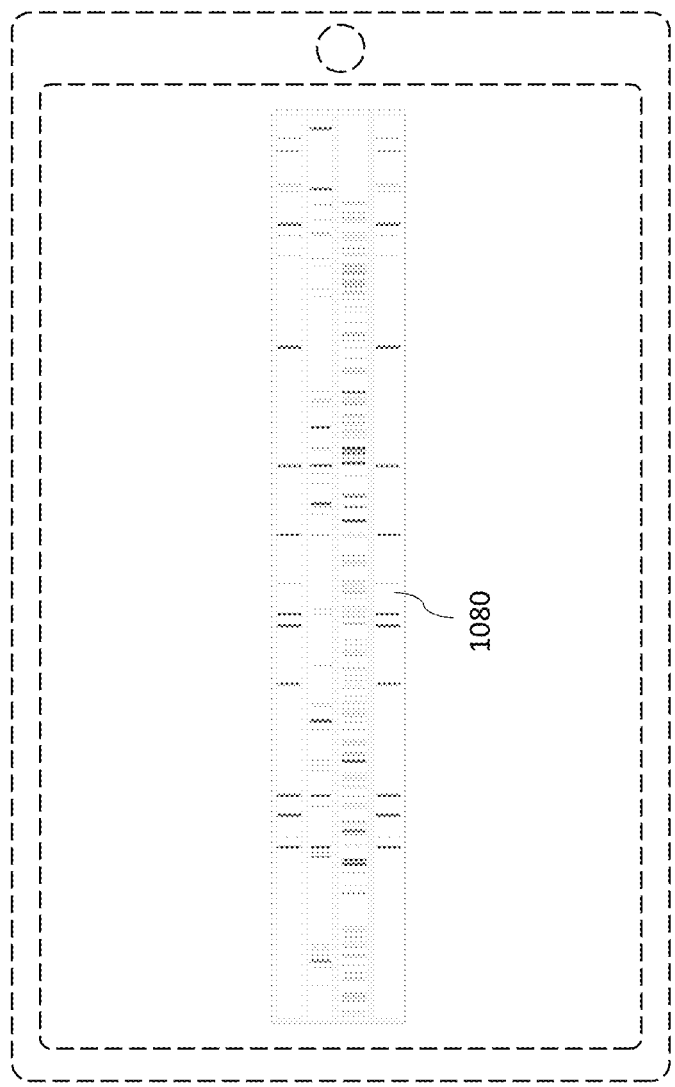

FIGS. 10A-10H show four examples of visualizations, with the respective visualizations shown on a computer monitor (FIG. 10A showing 1010, FIG. 10C showing 1020, FIG. 10E showing 1030, FIG. 10G showing 1040) and a tablet (FIG. 10B showing 1050, FIG. 10D showing 1060, FIG. 10F showing 1070, and FIG. 10H showing 1080). These visualizations have some similarity with the visualization shown in section 6 of FIG. 9. In these figures, visualizations are depicted, respectively on a computer and a tablet display, with the display shown using dotted lines to depict an environment. For example, in an embodiment, a visualization may be generated from network communication flows for a particular network device. A generated visualization may, for example, in an embodiment, graphically depict a vectorized count of processed network flow communication parameters of a set of network communication flow parameters captured over a period of time after having monitored network communication flows for a time period with respect to a particular network device.

For example, as shown, in FIGS. 10A and 10B, an embodiment comprises a display providing a horizontal box with short vertical lines as markers. Thus, for an illustrative embodiment, a marker may represent presence of a relevant characteristic in network communication flows of a network device. In this manner, for example, a network communication flow parameter may be depicted graphically. Shade and thickness of a vertical line may be modified to represent frequency of a characteristic for a vectorized set of samples processed for a network device. Thus, a thick, heavy line in the example shown illustrates a characteristic that is present and frequent, while a light thin line illustrates a characteristic that is present, but not frequent. Shading and thickness may also be employed to represent measured significance of a characteristic, such as previously described. For example, as previously explained, in this context, a low or a relatively low qualitative value for identification of a particular network device with respect to elements or sub-elements of network communication flow parameters refers to a relatively small marginal increase, if any, in accuracy of an otherwise satisfactory performing classifier by including the particular element or particular sub-element relative to omitting the particular element or particular sub-element. This aspect may, for example, be depicted with a light, thin vertical line whereas a higher qualitative value for identification of a characteristic might be depicted as a thick, heavy line. Likewise, color and/or shape may also be employed to call out differences visually, particularly with respect to comparisons of different vectorized sample sets for different network devices, as described below.

Comparisons of visualizations of vectorized sample sets for different network devices, for example, provides a visual mechanism for quickly making similarity and difference assessments. FIGS. 10C and 10D, for example, show three vectorized sample sets of network devices that exhibit similar characteristics and FIGS. 10E and 10F show two vectorized sample sets of network devices that exhibit different characteristics. Finally, FIGS. 10G and 10H show four vectorized sample sets in which two of the four sample sets have similar characteristics. Again, as suggested, for additional visual comparisons, color and/or shape may also call out differences, such as where a characteristic expected to be relatively similar between vectorized sample sets is not, and so forth. Thus, as suggested, similarities and/or differences may be observed visually to relatively quickly form conclusions or at least affect perceptions which may stimulate further investigation, for example.

It is noted that an Appendix is included at the end of the specification, before the claims, that provides illustrative examples of network devices that may be identified using an embodiment in accordance with claimed subject matter, as previously described. It is noted that claimed subject matter is not intended to be limited to these illustrative examples. Thus, many other network devices other than these devices may likewise be identified using an embodiment in accordance with claimed subject matter, as previously described. Furthermore, it may be that not all of these devices are necessarily identified, or it may even be that none of these examples of network devices ultimately end up being identified using an embodiment in accordance with claimed subject matter. However, these examples are intended to provide illustrations of types of devices that may be identified and, therefore, in an embodiment, for example, may be discovered and/or controlled at least partially.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 6:
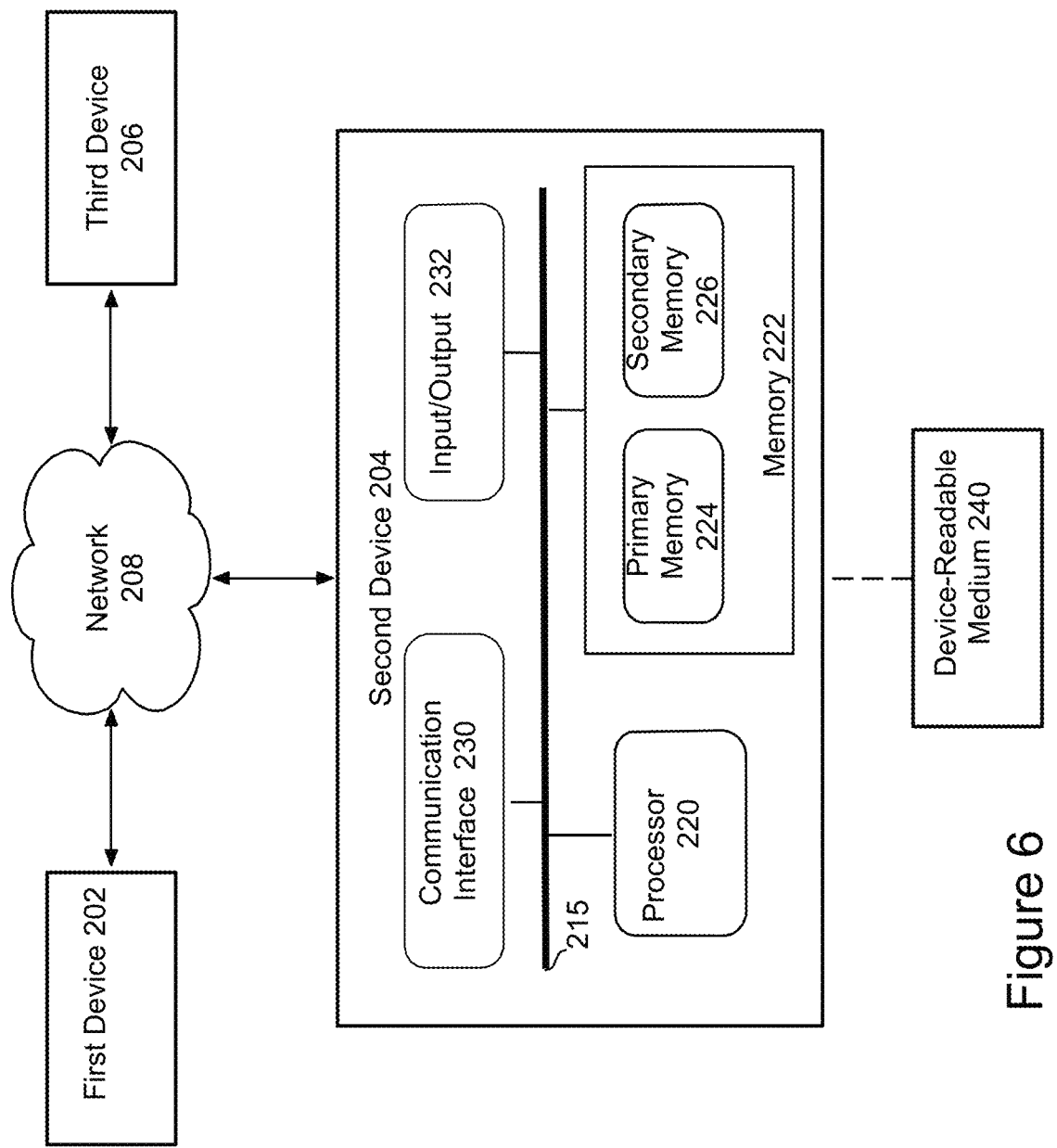
FIG. 6 is a schematic diagram of an illustrative embodiment of a client-server environment, such as may be employed to implement an embodiment of claimed subject matter.

In one example embodiment, as shown in FIG. 6, a system embodiment may comprise a local network (e.g., device 204 and medium 240) and/or another type of network, such as a computing and/or communications network. For purposes of illustration, therefore, FIG. 6 shows an embodiment 200 of a system that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1, 3 and 4, and in the text associated with the foregoing figure(s) of the present patent application.

Referring now to FIG. 6, in an embodiment, first and third devices 202 and 206 may be capable of rendering a graphical user interface (GUI) for a network device and/or a computing device, for example, so that a user-operator may engage in system use. Device 204 may potentially serve a similar function in this illustration. Likewise, in FIG. 6, computing device 202 ('first device' in figure) may interface with computing device 204 ('second device' in figure), which may, for example, also comprise features of a client computing device and/or a server computing device, in an embodiment. Processor (e.g., processing device) 220 and memory 222, which may comprise primary memory 224 and secondary memory 226, may communicate by way of a communication bus 215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 204, as depicted in FIG. 6, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 6, computing device 202 may provide one or more sources of executable computer instructions in the form physical states and/or signals (e.g., stored in memory states), for example. Computing device 202 may communicate with computing device 204 by way of a network connection, such as via network 208, for example. As previously mentioned, a connection, while physical, may not necessarily be tangible. Although computing device 204 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof may be used. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable computer instructions. For example, processor 220 may fetch executable instructions from memory and proceed to execute the fetched instructions. Memory 222 may also comprise a memory controller for accessing device readable-medium 240 that may carry and/or make accessible digital content, which may include code, and/or instructions, for example, executable by processor 220 and/or some other device, such as a controller, as one example, capable of executing computer instructions, for example. Under direction of processor 220, a non-transitory memory, such as memory cells storing physical states (e.g., memory states), comprising, for example, a program of executable computer instructions, may be executed by processor 220 and able to generate signals to be communicated via a network, for example, as previously described. Generated signals may also be stored in memory, also previously suggested.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 204 as including a component 232 operable with input/output devices, for example, so that signals and/or states may be appropriately communicated between devices, such as device 204 and an input device and/or device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

APPENDIX
Network Device Names

Amazon Dash
Amazon Device
Amazon Echo
Amazon Echo Connect
Amazon Echo Dot
Amazon Echo Plus
Amazon Echo Show
Amazon Echo Spot
Amazon Echo Tap
Amazon FireTV
Ambi Climate
Android Device
Anova
Apple Device
Apple Mac
Apple Watch
AppleTV
Arlo
Arlo Audio Doorbell
Arlo Camera
Arlo Pro
Arlo Pro 2
Arlo Q
Arlo Q+
Aruba Access Point
August
August
Aura
Awair
AWS IoT Button
Belkin Mini Smart Plug
Belkin Smart Plug
Belkin Wemo Smart Light Switch
Bitdefender BOX
Blossom
Body Cardio
Bosch Connected Control
Bose Bass Module 500
Bose Bass Module 700
Bose Lifestyle SoundTouch 135 Entertainment System
Bose Lifestyle SoundTouch 525 Entertainment System
Bose Lifestyle SoundTouch 535 Entertainment System
Bose Soundbar 500
Bose Soundbar 700
Bose SoundTouch 10 wireless speaker
Bose SoundTouch 120 Home Theatre System
Bose SoundTouch 130 Home Theatre System
Bose SoundTouch 20 wireless speaker
Bose SoundTouch 30 wireless speaker
Bose SoundTouch 300 soundbar
Bose SoundTouch 520 Home Theatre System
Bose SoundTouch outdoor wireless system with 151 speakers
Bose SoundTouch outdoor wireless system with 251 speakers
Bose SoundTouch Portable Wi-Fi Music System
Bose SoundTouch SA-4 Amplifier
Bose SoundTouch SA-5 amplifier
Bose SoundTouch Wireless Link adapter
Bose Surround Speakers
Bose Wave SoundTouch system IV
Canary
Chamberlain
ChargePoint Home WiFi Enabled Electric Vehicle (EV) Charger
Click & Grow
CURB Home Energy Monitoring System
Denon Heos APPENDIX
Network Device Names ecobee ecobee3 lite Wi-Fi thermostat
ecobee ecobee3 Thermostat
ecobee ecobee4 Thermostat
ecobee Smart Si Thermostat
ecobee Smart Thermostat
ecobee Switch+
Edyn
eero Beacon
eero Pro
Fitbit Device
Foobot
Garageio
Google Home
Harmony Universal Remote
Hikvision
Honeywell T10 Pro Smart Thermostat
Honeywell T5+Smart Thermostat
Honeywell T6 Pro Smart Thermostat
Honeywell T9 Smart Thermostat
Honeywell VisionPRO Wi-Fi 7-Day Programmable Thermostat
Honeywell Wi-Fi 7-Day Programmable Thermostat
Honeywell Wi-Fi 7-Day Programmable Touchscreen Thermostat
Honeywell Wi-Fi 9000 7-Day Programmable Thermostat
Honeywell Wi-Fi 9000 with Voice Control Thermostat
Honeywell Wi-Fi Smart Color Thermostat
Honeywell Wi-Fi Smart Thermostat
Honeywell Lyric Round Wi-Fi Thermostat
Honeywell Round Smart Thermostat - 2nd Generation
Hydrawise
iHome iSP5 SmartPlug
iHome iSP6 SmartPlug
iHome iSP6X SmartPlug
iHome iSP8 SmartPlug
In.Sight
iOS Device
JuiceBox Pro 40 Smart Electric Vehicle (EV) Charging Station
June
Kaleidescape Player
Kaleidescape Server
Keen Home
Kepler
Kindle Device
Leviton Decora Smart Wi-Fi 1000 W Dimmer
Leviton Decora Smart Wi-Fi 15 A Switch
Leviton Decora Smart Wi-Fi 600 W Dimmer
Leviton Decora Smart Wi-Fi Plug-in Dimmer
Leviton Decora Smart Wi-Fi Plug-in Outlet
LiFi Labs LIFX Color 1000 Wi-Fi LED Bulb (A19)
LiFi Labs LIFX Original Wi-Fi Smart LED Light Bulb
LiFi Labs LIFX White 800 Wi-Fi LED Bulb (A19)
Linux Device
Lockitron Bolt with WiFi bridge
Logitech Circle
Logitech Harmony Elite
Logitech Logitech Harmony Hub
Logitech Pop
Lutron Caseta Smart Fan Speed Control
Lutron Caseta Smart Lighting Dimmer Switch
Lutron Caseta Wireless 600W In-Wall Pro Switch
Lutron Caseta Wireless Plug-In Lamp Dimmer
LUX Kono
LUX/GEO
Mimo
MUTT-Sensor
Mr. Coffee
Muzo Cobblestone
Neato
Nest Cam Outdoor
Nest Camera
Nest Protect APPENDIX
Network Device Names Nest Thermostat
Nest Thermostat
Networking Device
Newly Discovered
Ninja Sphere
Notion Kit
Optigo
Parrot
Petnet SmartFeeder
Philips Hue
Philips Hue Go Lamp
Philips Hue Lightstrip Plus LED Light Strip
Philips Hue White Ambiance LED Light Bulb
Philips Hue White and Color Ambiance LED Light
Philips Hue White LED Bulb (A19)
PlayStation
Printer
Raspberry Pi
Ring Floodlight Cam
Ring Spotlight Cam Mount
Ring Spotlight Cam Wired
Ring Video Doorbell
Ring Video Doorbell Pro
Samsung Connect Home
Samsung Connect Home Pro
Samsung SmartThings Wifi
Scout Alarm
Sense
Singlecue
SkyBell
Skydrop
Sleep
SmartThings ADT Home Security Starter Kit
SmartThings ADT Security Hub
SmartThings Home Monitoring Kit
SmartThings Hub
SmartThings Hub (2015)
SmartThings Link for NVIDIA ® SHIELD ™ TV
Sonos
Sugr Cube
Synology NAS
Termo
TP-Link Home Automation
TP-Link Wi-Fi Lights
Wemo Smart Plug
Wii Game Console
Windows Computer
Withings
Xbox

The invention claimed is:

1. An apparatus comprising:
one or more processors coupled to one or more physical memory devices to store executable instructions and to store binary digital signal quantities as physical memory states, wherein the executable instructions being accessible from the one or more physical memory devices for execution by the one or more processors;
the one or more processors able to store in at least one of the physical memory devices, binary signal quantities, if any, that are to result from execution of the instructions on the one or more processors;
wherein the accessed executable instructions to identify a particular network device;
wherein the particular network device is to be engaged in network communications via a network;
the particular network device identifying instructions further to:
monitor for a period of time respective network communication flows to be engaged in by the particular network device, wherein a respective monitored network communication flow to comprise flow detail records that include a set of network flow communication parameters;

process in a time sequenced order selected network flow communication parameters of the set for the respective monitored network communication flows with respect to the particular network device for the period of time, and to process the remaining selected network communication flow parameters after removing at least one domain name suffix or at least one domain prefix from the selected network communication flow parameters;

vectorize a count of the processed network flow communication parameters of the set captured over the period of time after having monitored a particular number of respective network communication flows for the period of time with respect to the particular network device;

identify the particular network device based at least in part on the vectorized count for the particular network device over the period of time; and block access to the particular network device based at least in part on an abnormal vectorized count for the particular network device, wherein the particular network device identifying instructions to vectorize the count of the processed network flow communication parameters further comprise executable instructions to vectorize one or more formed pre-vectorization units (PVUs) for the particular network device;

wherein the executable instructions to vectorize further comprise instructions to:

identify within the one or more PVUs for the particular network device a number of instances of respective selected network flow communication parameters;

count within the one or more PVUs for the particular network device the number of instances of the respective selected network flow communication parameters; and weight the count of the number of instances of the respective selected network flow communication parameters within the one or more PVUs for the particular network device; and wherein the executable instructions to weight the count of the number of instances of the respective selected network flow communication parameters within the one or more PVUs for the particular network device further comprise executable instructions to employ a term-frequency weighting operation with respect to the count of the number of instances of the respective selected network flow communication parameters within the one or more PVUs for the particular network device.

2. The apparatus of claim 1, wherein the particular network device identifying instructions further to process in the time sequenced order selected network flow communication parameters of the set for the respective monitored network communication flows, wherein the executable instructions further comprise executable instructions to process the selected network flow communication parameters, wherein the processed network flow communication parameters comprise at least one of the following: a time stamp, a source IP address, a destination IP address, an IP protocol; a source port at least for UDP or TCP, a destination port at least for UDP or TDP, an IP type of service, an identifier or any combination thereof.

3. The apparatus of claim 2, wherein the particular network device identifying instructions to process in the time sequenced order selected network flow communication parameters of the set for the respective monitored network communication flows further comprise executable instructions to:

accumulate and sort the monitored network flow detail records for the particular network device over the period of time; and process the selected network flow communication parameters of the monitored network flow detail records for the particular network device over the period of time.

4. The apparatus of claim 1, wherein the at least one domain name suffix comprises .com, .net, .org, and wherein the at least one domain name prefix comprises www, example, time, ntp, pool, digits 0-9, dashes, or any combination thereof.

5. The apparatus of claim 1, wherein the particular network device identifying instructions to process the remaining network communication flow parameters further include executable instructions to concatenate the remaining network communication flow parameters for a grouping of flow detail records to form a pre-vectorization unit.

6. The apparatus of claim 1, wherein the particular network device identifying instructions comprise executable instructions to identify the particular network device further include executable instructions to employ multiple trained machine learning classifiers with respect to one or more vectorized pre-vectorization units (PVUs) for the particular network device.

7. The apparatus of claim 1, wherein the executable instructions to employ multiple trained machine learning classifiers further comprise executable instructions to employ at least one of the following machine learning classification types with respect to the multiple trained machine learning classifiers: support vector machine classification; logistic regression classification and/or neural network classification.

8. An apparatus comprising:

one or more processors coupled to one or more physical memory devices to store executable instructions and to store binary digital signal quantities as physical memory states, wherein the executable instructions being accessible from the one or more physical memory devices for execution by the one or more processors;

the one or more processors able to store in at least one of the physical memory devices, binary signal quantities, if any, that are to result from execution of the instructions on the one or more processors, wherein the accessed executable instructions to train a machine learning classifier for a particular network device;

wherein the particular network device and other network devices are to be engaged in network communications via a network;

the accessed executable instructions further to:

monitor for a period of time respective network communication flows to be engaged in by the particular network device and the other network devices, wherein a respective monitored network communication flow to comprise flow detail records that include a set of network flow communication parameters;

process in a time sequenced order selected network flow communication parameters of the set for the respective monitored network communication flows with respect to the particular network device and the other network devices for the period of time, and to process the remaining selected network communication flow parameters after removing at least one domain name suffix or at least one domain prefix from the selected network communication flow parameters;
vectorize a count of the processed network flow communication parameters of the set captured over the period of time after having monitored a particular number of respective network communication flows for the period of time with respect to the particular network device and the other network devices;
identify the particular network device based at least in part on the vectorized count for the particular network device over the period of time; and
block access to the particular network device based at least in part on an abnormal vectorized count for the particular network device,
wherein the particular network device identifying instructions to vectorize the count of the processed network flow communication parameters further comprise executable instructions to vectorize one or more formed pre-vectorization units (PVUs) for the particular network device;
wherein the executable instructions to vectorize further comprise instructions to:
identify within the one or more PVUs for the particular network device a number of instances of respective selected network flow communication parameters;
count within the one or more PVUs for the particular network device the number of instances of the respective selected network flow communication parameters; and
weight the count of the number of instances of the respective selected network flow communication parameters within the one or more PVUs for the particular network device; and
wherein the executable instructions to weight the count of the number of instances of the respective selected network flow communication parameters within the one or more PVUs for the particular network device further comprise executable instructions to employ a term-frequency weighting operation with respect to the count of the number of instances of the respective selected network flow communication parameters within the one or more PVUs for the particular network device.

9. The apparatus of claim 8, wherein the accessed executable instructions to process in the time sequenced order selected network flow communication parameters of the set for the respective monitored network communication flows further comprise executable instructions to process the selected network flow communication parameters, wherein the processed network flow communication parameters comprise at least one of the following: a time stamp, a source IP address, a destination IP address, an IP protocol; a source port at least for UDP or TCP, a destination port at least for UDP or TDP, an IP type of service, an identifier or any combination thereof.

10. The apparatus of claim 8, wherein the accessed executable instructions to process in a time sequenced order selected network flow communication parameters of the set for the respective monitored network communication flows further comprise executable instructions to:
accumulate and sort the monitored network flow detail records for the particular network device and the other network devices over the period of time; and
process the selected network flow communication parameters of the monitored network flow detail records for the particular network device and the other network devices over the period of time.

11. The apparatus of claim 10, wherein the at least one domain name suffix comprises.com, .net, .org, and wherein the at least one domain name prefix comprises www, example, time, ntp, pool, digits 0-9, dashes, or any combination thereof.

12. The apparatus of claim 11, wherein the accessed executable instructions to process the remaining network communication flow parameters further include executable instructions to concatenate the remaining network communication flow parameters for a grouping of flow detail records to form one or more pre-vectorization units.

13. The apparatus of claim 12, wherein the accessed executable instructions to vectorize the count of the processed network flow communication parameters further comprise executable instructions to vectorize the one or more formed pre-vectorization units (PVUs);
wherein the executable instructions to vectorize comprise instructions to:
identify within the one or more formed PVUs for the particular network device and the other network devices over the period of time the number of instances of respective selected network flow communication parameters;
count within the one or more formed PVUs for the particular network device and the other network devices over the period of time the number of instances of the respective selected network flow communication parameters;
weight the count of the number of instances of the respective selected network flow communication parameters within the one or more formed PVUs for the particular network device and the other network devices over the period of time; and
wherein the executable instructions to weight the count of the number of instances of the respective selected network flow communication parameters within the one or more formed PVUs further comprise executable instructions to employ a term-frequency weighting operation with respect to the count within the one or more formed PVUs of the number of instances of the respective selected network flow communication parameters.

14. The apparatus of claim 13, wherein the accessed executable instructions to vectorize the count of the processed network flow communication parameters of the set captured over the period of time after having monitored the particular number of respective network communication flows for the period of time with respect to the particular network device and the other network devices further comprise executable instructions to use the one or more vectorized PVUs to train a machine learning classifier for the particular network device.

15. The apparatus of claim 14, wherein the accessed executable instructions to use the one or more vectorized PVUs to train a machine learning classifier for the particular network device further comprises executable instructions to train the machine learning classifier to perform at least one of the following types of machine learning classification: support vector machine classification; logistic regression classification and/or neural network classification.

16. An article comprising: a non-transitory storage medium having stored thereon instructions, the stored instructions executable by one or more processors coupled to one or more physical memory devices, including the non-transitory storage medium, to store executable instructions and to store binary digital signal quantities as physical memory states, wherein the executable instructions being accessible from the one or more physical memory devices, including the non-transitory storage medium, for execution by the one or more processors;

the one or more processors able to store in at least one of the physical memory devices, binary signal quantities, if any, that are to result from execution of the instructions on the one or more processors;

wherein the accessed executable instructions to identify a particular network device;

wherein the particular network device is to be engaged in network communications via a network;

the particular network device identifying instructions further to:

monitor for a period of time respective network communication flows to be engaged in by the particular network device, wherein a respective monitored network communication flow to comprise flow detail records that include a set of network flow communication parameters;

process in a time sequenced order selected network flow communication parameters of the set for the respective monitored network communication flows with respect to the particular network device for the period of time, and to process the remaining selected network flow communication flow parameters after removing at least one domain name suffix or at least one domain prefix from the selected network communication flow parameters;

vectorize a count of the processed network flow communication parameters of the set captured over the period of time after having monitored a particular number of respective network communication flows for the period of time with respect to the particular network device;

identify the particular network device based at least in part on the vectorized count for the particular network device over the period of time; and block access to the particular network device based at least in part on an abnormal vectorized count for the particular network device, wherein the particular network device identifying instructions to vectorize the count of the processed network flow communication parameters further comprise executable instructions to vectorize one or more formed pre-vectorization units (PVUs) for the particular network device;

wherein the executable instructions to vectorize further comprise instructions to:

identify within the one or more PVUs for the particular network device a number of instances of respective selected network flow communication parameters;

count within the one or more PVUs for the particular network device the number of instances of the respective selected network flow communication parameters; and weight the count of the number of instances of the respective selected network flow communication parameters within the one or more PVUs for the particular network device; and wherein the executable instructions to weight the count of the number of instances of the respective selected network flow communication parameters within the one or more PVUs for the particular network device further comprise executable instructions to employ a term-frequency weighting operation with respect to the count of the number of instances of the respective selected network flow communication parameters within the one or more PVUs for the particular network device.

17. The article of claim 16, wherein the particular network device identifying instructions to process in the time sequenced order selected network flow communication parameters of the set for the respective monitored network communication flows further comprise executable instructions to:

accumulate and sort the monitored network flow detail records for the particular network device over the period of time; and process the selected network flow communication parameters of the monitored network flow detail records for the particular network device over the period of time.

18. The article of claim 16, wherein the particular network device identifying instructions comprise executable instructions to identify the particular network device further comprise executable instructions to employ multiple trained machine learning classifiers with respect to one or more vectorized pre-vectorization units (PVUs) for the particular network device.

19. The article of claim 18, wherein the executable instructions to employ multiple trained machine learning classifiers further comprise executable instructions to employ at least one of the following machine learning classification types with respect to the multiple trained machine learning classifiers: support vector machine classification; logistic regression classification and/or neural network classification.

* * * * *